US012737920B2

(12) United States Patent
Sato et al.

(10) Patent No.: US 12,737,920 B2
(45) **Date of Patent: *Sep. 15, 2026**

(54) CONSTRUCTION ASSISTING METHOD, CONSTRUCTION ASSISTING DEVICE, AND NON-TRANSITORY COMPUTER-READABLE STORAGE MEDIUM STORING INFORMATION PROCESSING PROGRAM

(71) Applicant: SEIKO EPSON CORPORATION, Tokyo (JP)

(72) Inventors: Reito Sato, Suwa (JP); Junichi Wakabayashi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/047,951

(22) Filed: Feb. 7, 2025

(65) Prior Publication Data

US 2025/0259330 A1 Aug. 14, 2025

(30) Foreign Application Priority Data

Feb. 9, 2024 (JP) ................................ 2024-018897

(51) Int. Cl.
*G06T 7/73* (2017.01)
*H04N 9/31* (2006.01)

(52) U.S. Cl.
CPC ................ *G06T 7/74* (2017.01); *H04N 9/31* (2013.01); *G06T 2207/20092* (2013.01); *G06T 2207/30181* (2013.01); *G06T 2207/30204* (2013.01)

(58) Field of Classification Search
CPC ..................................................... G01N 21/95
See application file for complete search history.

(56) References Cited

U.S. PATENT DOCUMENTS 4,167,592 A * 9/1979 Gabel .................. E01C 23/163 239/150
9,702,830 B1 * 7/2017 Akselrod ................ H04L 67/12
2014/0233808 A1 * 8/2014 Peckover ................. G06T 7/50 382/108
2017/0072843 A1 * 3/2017 Lection .................. B60Q 1/545
2017/0223321 A1 * 8/2017 Kang .................. H04N 9/3185
(Continued)

FOREIGN PATENT DOCUMENTS

JP H05-167950 A 7/1993
JP H11-278364 A 10/1999
(Continued)

OTHER PUBLICATIONS

Atomix Corporation. “Details of Product Information.” Aug. 4, 2021.

(Continued)

*Primary Examiner* — Mushfikh I Alam
(74) *Attorney, Agent, or Firm* — Oliff PLC

(57) ABSTRACT

A construction assisting method includes acquiring a captured image showing a road surface and an object on the road surface, determining, based on the object on the road surface included in the captured image, a position on the road surface ono which a first image used for painting a road marking on the road surface is projected, and causing an optical device to project the first image onto the position on the road surface.

10 Claims, 21 Drawing Sheets

(56) References Cited

U.S. PATENT DOCUMENTS

| | | | | |
|---|---|---|---|---|
| 2018/0007328 | A1* | 1/2018 | Kursula | H04N 9/3188 |
| 2020/0307640 | A1* | 10/2020 | Tsuji | G05D 1/0268 |
| 2021/0364900 | A1* | 11/2021 | Hsien | G03B 21/2066 |
| 2022/0099443 | A1 | 3/2022 | Nishita et al. | |
| 2022/0295025 | A1* | 9/2022 | Seidel | G09G 3/001 |
| 2023/0347942 | A1* | 11/2023 | Kobayashi | B60W 60/005 |
| 2025/0181137 | A1* | 6/2025 | Chrzanowski | G06F 3/011 |

FOREIGN PATENT DOCUMENTS

| | | | |
|---|---|---|---|
| JP | 2004-279233 | A | 10/2004 |
| JP | 2015-086590 | A | 5/2015 |
| JP | 2016-108745 | A | 6/2016 |
| JP | 2018-047832 | A | 3/2018 |
| JP | 2020-180480 | A | 11/2020 |
| JP | 2021-140655 | A | 9/2021 |
| JP | 2022-055525 | A | 4/2022 |

OTHER PUBLICATIONS

Daia Corporation. “Road Machine.” Dec. 9, 2023.
Koki Holdings Co., Ltd. “Hikoki Laser Marker.” Oct. 31, 2023.
Robert Bosch Power Tools GmbH. “Bosch Laser Marker.” Jan. 14, 2024.
Yamashinseikyo Co.,Ltd. “Laser Tools.” Sep. 23, 2023.
Muratec KDS Corp. “Muratec Laser Marker.” Nov. 11, 2023.
TJM Design Corp. “TAJIMA Laser Marker.” Jan. 5, 2024.
T-iDigital Marking. “Develops Projection Mapping-Based Marking Technology T-Digital Marking.” 2021.
Voice. “Voice.” Jan. 19, 2024.
Shinwa Rules Co., Ltd. “Marking/Standard Setting Tool List.” Dec. 3, 2023.
Gikousya Co., Ltd. “Gikousya Co., Ltd.” Oct. 17, 2022.
Ministry of Land, Infrastructure, Transport. “The Current State of the Construction Industry and Construction Workers.”
Ministry of Land, Infrastructure, Transport. “On Ensuring Promotion of Safety & Health of Construction Workers.” 2008.
Hanshin Expressway Engineering. Apr. 26, 2022.
“Rechargeable Indoor-Outdoor Marker.” Jun. 27, 2024.
The Path to Profi. “Robot Conducts Highly-skilled Process Effortlessly! #28.” Dec. 9, 2014.
Zenhyokyo Natsume. “National Road Signs and Markings Association Promotional Video.” Nov. 2, 2016.
Panasonic Corporation. “Electric Tool Laser Marker.” Jan. 16, 2024.
National Institute for Land and Infrastructure Management. “Appendix 1.” Oct. 17, 2022.
General Incorporated Association of National Road Sign and Marking Industry Association. “Traffic Sign and Lane Marking Technician.” Oct. 17, 2022.
Shinshu11. “how to write ‘stop’.” Feb. 15, 2012.
U.S. Appl. No. 19/065,533, filed Feb. 27, 2025 in the name of Wakabayashi et al.

* cited by examiner 1
10
20
21
210
CB
11
150
HD
PD
W1
W2
RT
RS
x1
x2
z
z1
z2
y2
x SL
LN1
LN2
LN3
LN4
LN5
LN6
LN7
LN8
LN9
LN10
L1
L2
L3
IA
CL
RM
RS
U
1
x1
x2
y1
y2
z2
x
y
X1
X2
Y1
Y2
Z1
X
Y

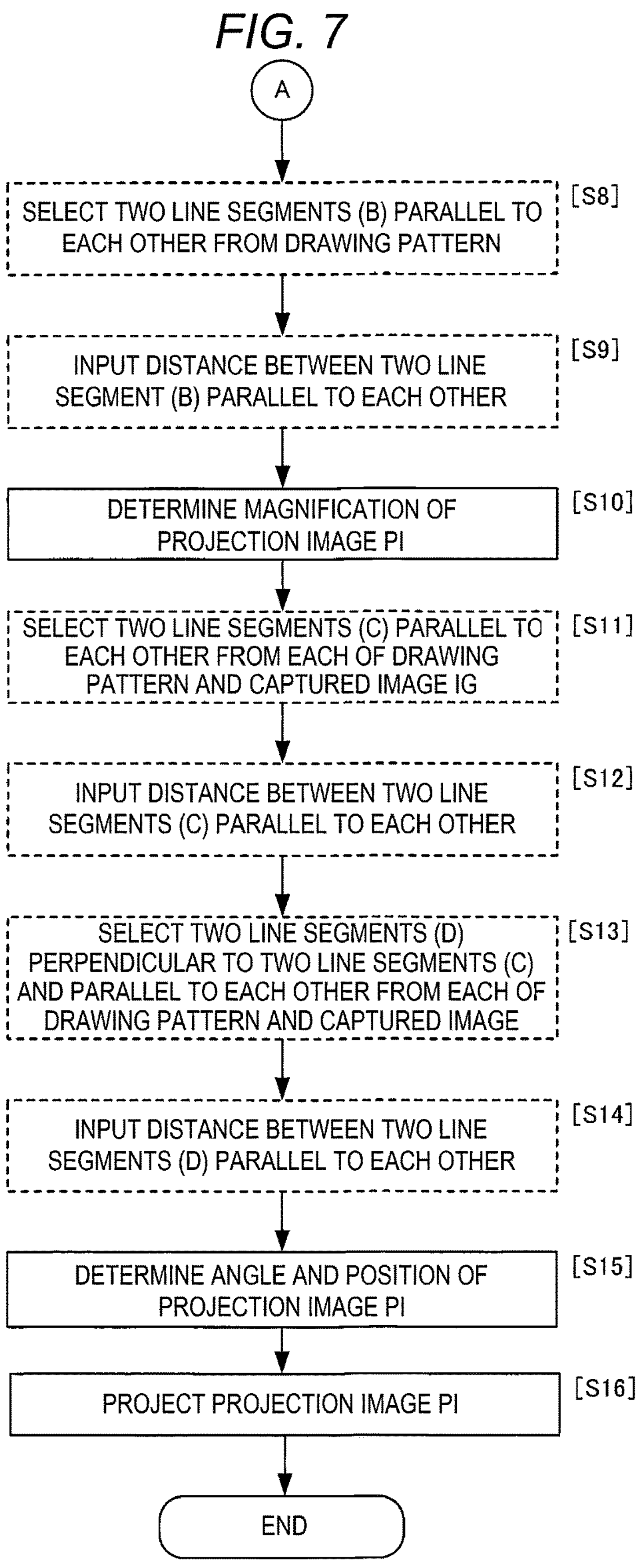
FIG. 7
A
SELECT TWO LINE SEGMENTS (B) PARALLEL TO EACH OTHER FROM DRAWING PATTERN
[S8]
INPUT DISTANCE BETWEEN TWO LINE SEGMENT (B) PARALLEL TO EACH OTHER
[S9]
DETERMINE MAGNIFICATION OF PROJECTION IMAGE PI
[S10]
SELECT TWO LINE SEGMENTS (C) PARALLEL TO EACH OTHER FROM EACH OF DRAWING PATTERN AND CAPTURED IMAGE IG
[S11]
INPUT DISTANCE BETWEEN TWO LINE SEGMENTS (C) PARALLEL TO EACH OTHER
[S12]
SELECT TWO LINE SEGMENTS (D) PERPENDICULAR TO TWO LINE SEGMENTS (C) AND PARALLEL TO EACH OTHER FROM EACH OF DRAWING PATTERN AND CAPTURED IMAGE
[S13]
INPUT DISTANCE BETWEEN TWO LINE SEGMENTS (D) PARALLEL TO EACH OTHER
[S14]
DETERMINE ANGLE AND POSITION OF PROJECTION IMAGE PI
[S15]
PROJECT PROJECTION IMAGE PI
[S16]
END

FIG. 8

PLEASE SELECT TWO PARALLEL REFERENCE LINES

M1
IW
SL
LN2
LN3
CL
IG
BT1
OK
BT2
Cancel
DS1

FIG. 9

PLEASE INPUT INTERVALS BETWEEN SELECTED LINE SEGMENTS

M2

IW

TX cm

SL

AI3(D1)

AI1

LN2

AI2

LN3

CL

IG

BT1

OK

BT2

Cancel

PLEASE SELECT TWO PARALLEL LINE SEGMENTS

M3
IW
DP1
LN9
LN7
L1
LN8
LN10
BT1
OK
BT2
Cancel
DS3

FIG. 11

PLEASE INPUT INTERVALS BETWEEN SELECTED LINE SEGMENTS

M4

IW

TX cm

BT1

OK

BT2

Cancel

PLEASE SELECT TWO PARALLEL LINE SEGMENTS

M5

IW

SL

LN2

LN4

LN3

LN1

LN5

LN9

LN7

LN8

DP1

IG

LN10

CL

BT1

OK

BT2

Cancel

PLEASE INPUT INTERVALS BETWEEN SELECTED LINE SEGMENTS

M6

IW

TX cm

DS6

DP1

AI8

SL

IG

CL

LN4

AI9(D3)

LN8

AI7

BT1

BT2

OK

Cancel

FIG. 14

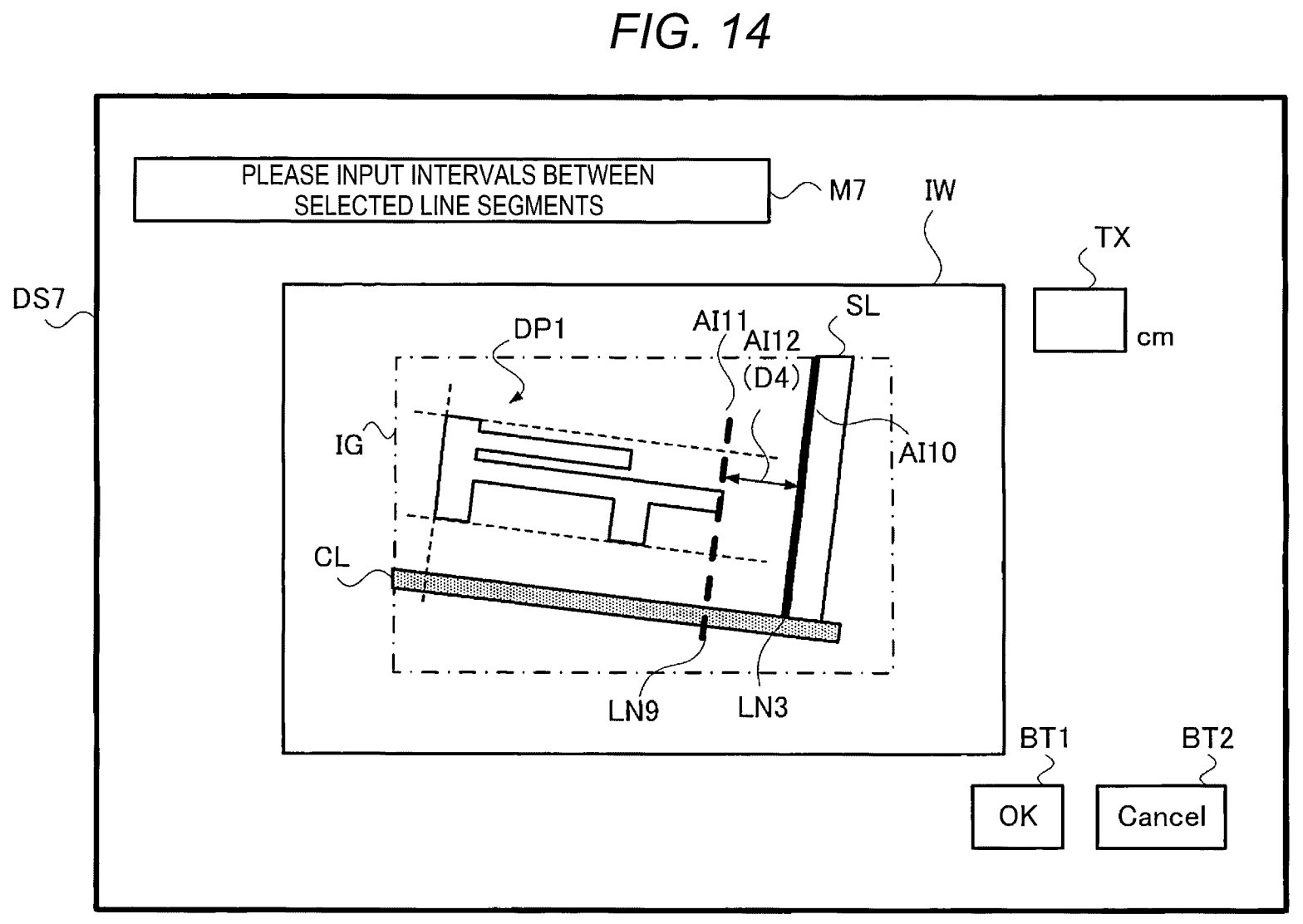

PLEASE INPUT INTERVALS BETWEEN SELECTED LINE SEGMENTS

M7
TX
cm
BT2
Cancel
BT1
OK
IW
AI10
SL
AI12
(D4)
AI11
LN3
LN9
DP1
IG
CL
DS7

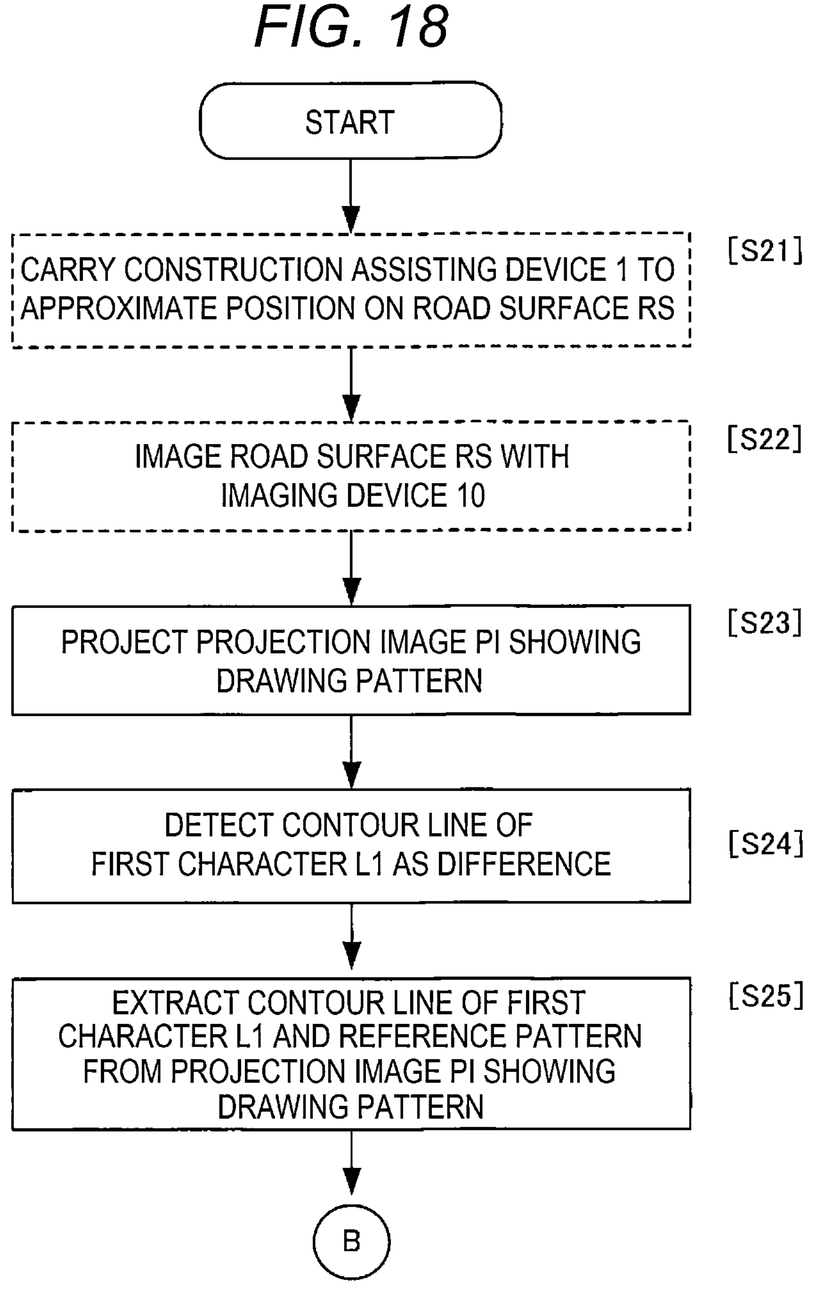
FIG. 18
START
CARRY CONSTRUCTION ASSISTING DEVICE 1 TO APPROXIMATE POSITION ON ROAD SURFACE RS
[S21]
IMAGE ROAD SURFACE RS WITH IMAGING DEVICE 10
[S22]
PROJECT PROJECTION IMAGE PI SHOWING DRAWING PATTERN
[S23]
DETECT CONTOUR LINE OF FIRST CHARACTER L1 AS DIFFERENCE
[S24]
EXTRACT CONTOUR LINE OF FIRST CHARACTER L1 AND REFERENCE PATTERN FROM PROJECTION IMAGE PI SHOWING DRAWING PATTERN
[S25]
B

PI

L1

SL1

CL1

CONSTRUCTION ASSISTING METHOD, CONSTRUCTION ASSISTING DEVICE, AND NON-TRANSITORY COMPUTER-READABLE STORAGE MEDIUM STORING INFORMATION PROCESSING PROGRAM

The present application is based on, and claims priority from JP Application Serial Number 2024-018897, filed Feb. 9, 2024, the disclosure of which is hereby incorporated by reference herein in its entirety.

BACKGROUND

1. Technical Field

The present disclosure relates to a construction assisting method, a construction assisting device, and a non-transitory computer-readable storage medium storing an information processing program.

2. Related Art

JP-A-2015-086590 discloses a technique relating to a road marking painting machine for drawing a road marking. The road marking painting machine includes a positioning unit that receives positioning signal radio waves from satellites and measures a current position. When the positioning unit receives signal radio waves from GPS satellites and quasi-zenith satellites, the road marking painting machine automatically performs positioning and painting of a road marking.

JP-A-2015-086590 is an example of the related art.

However, in the road marking painting device according to JP-A-2015-086590, since positioning using satellite signals is performed, positioning accuracy in a place where radio waves from the satellites less easily reach such as the inside of a tunnel or a place behind a building is deteriorated. For this reason, the road marking painting machine has a restriction in a place where the road marking painting machine can be used.

SUMMARY

According to an aspect of the present disclosure, there is provided a construction assisting method including: acquiring a captured image showing a road surface and an object on the road surface; determining, based on the object on the road surface included in the captured image, a position on the road surface ono which a first image used for painting a road marking on the road surface is projected; and causing an optical device to project the first image onto the position on the road surface.

According to an aspect of the present disclosure, there is provided a construction assisting device including a processing device configured to execute: acquiring a captured image showing a road surface and an object on the road surface; determining, based on the object on the road surface included in the captured image, a position on the road surface onto which a first image used for painting a road marking on the road surface is projected; and causing an optical device to project the first image onto the position on the road surface.

According to an aspect of the present disclosure, there is provided a non-transitory computer-readable storage medium storing an information processing program, the information processing program causing a computer to implement: acquiring a captured image showing a road surface and an object on the road surface; determining, based on the object on the road surface included in the captured image, a position on the road surface onto which a first image used for painting a road marking on the road surface is projected; and causing an optical device to project the first image onto the position on the road surface.

BRIEF DESCRIPTION OF THE DRAWINGS

FIG. 7 is a flowchart illustrating the projection method for the projection image showing the drawing pattern by the construction assisting device.

FIG. 8 is an example of a display screen displayed on a display device.

FIG. 9 is an example of a display screen displayed on the display device.

FIG. 10 is an example of a display screen displayed on the display device.

FIG. 11 is an example of a display screen displayed on the display device.

FIG. 12 is an example of a display screen displayed on the display device.

FIG. 13 is an example of a display screen displayed on the display device.

FIG. 14 is an example of a display screen displayed on the display device.

FIG. 15 is a diagram illustrating a projection example of an image showing a drawing pattern of the road marking on the road surface.

FIG. 18 is a flowchart illustrating a projection method for a projection image showing a drawing pattern by a construction assisting device.

DESCRIPTION OF EMBODIMENTS

Figure 1:
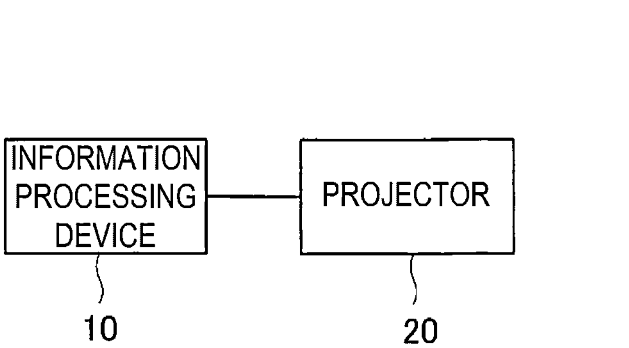
FIG. 1 is a block diagram illustrating a configuration of a construction assisting device.

Modes for implementing the present disclosure are explained below with reference to the drawings. In the drawings, dimensions and scales of units are differentiated from actual ones as appropriate. Embodiments explained below are preferred specific examples of the present disclosure. Therefore, various technically preferable limitations are added to the embodiments. However, the scope of the present disclosure is not limited to these embodiments unless there is particularly a description to the effect that the present disclosure is limited.

1: FIRST EMBODIMENT

A construction assisting device 1 according to the present embodiment is explained with reference to FIGS. 1 to 15.

1-1: Overall Configuration

FIG. 1 is a block diagram illustrating a configuration of a construction assisting device 1 according to the present embodiment. The construction assisting device 1 includes an information processing device 10 and a projector 20. The information processing device 10 and the projector 20 are communicably connected to each other.

The construction assisting device 1 is a device that, when a road marking is drawn on a road surface RS, projects an image showing a drawing pattern used for the drawing onto the road surface RS. The drawing pattern includes, for example, a contour line of a road marking RM drawn on the road surface. The drawing pattern may further include an auxiliary image AI for drawing the road marking RM. The road marking RM is drawn by, for example, a user U of the construction assisting device 1 coating a paint on a road surface using a publicly-known painting machine different from the construction assisting device 1.

The projector 20 is a device that projects an image showing the drawing pattern explained above onto the road surface RS. The information processing device 10 is a device that controls the projector 20. When the information processing device 10 controls the projector 20, the projector 20 projects the image showing a drawing pattern onto the road surface RS.

Figure 2:
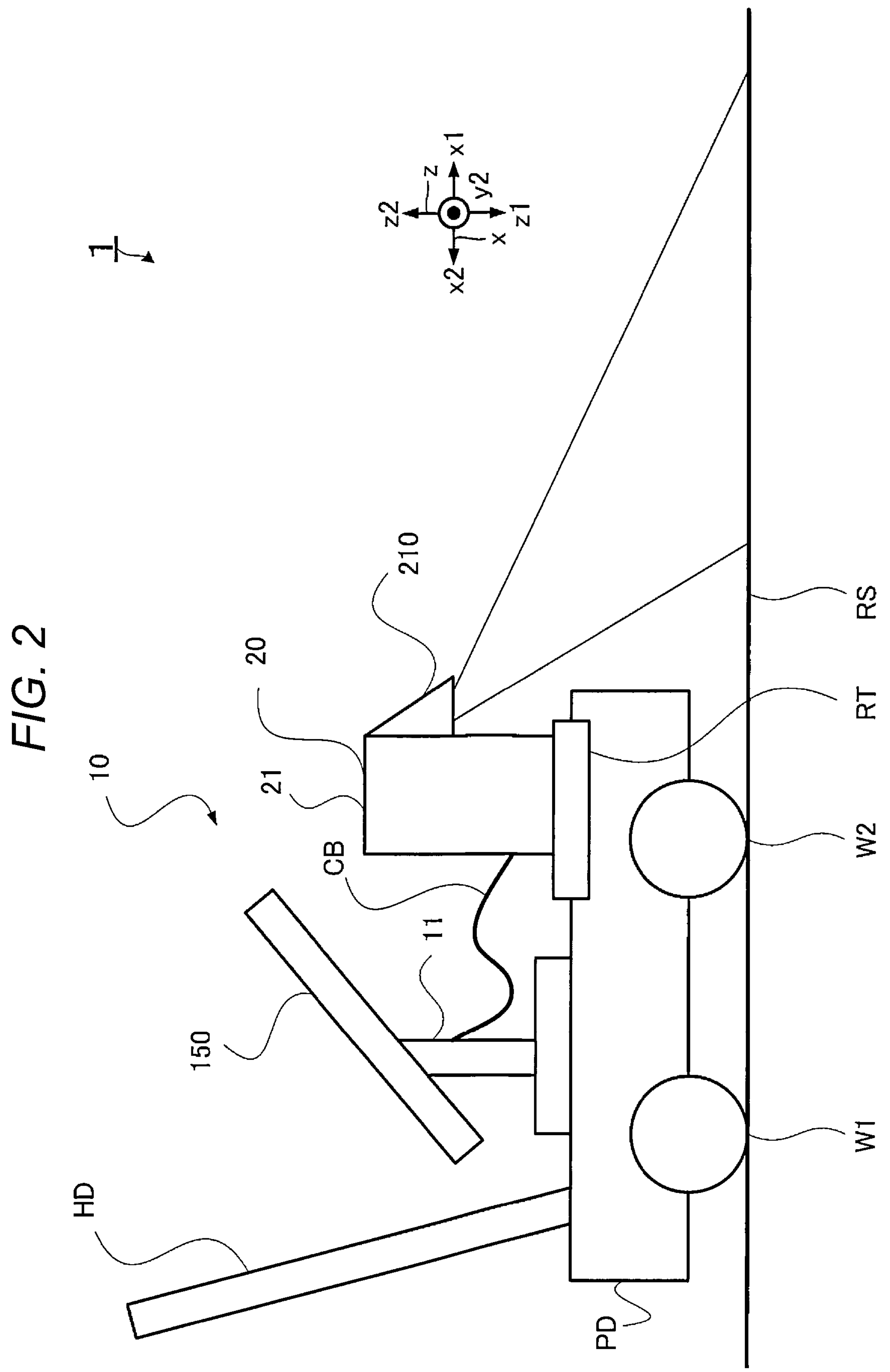
FIG. 2 is an exterior view of the construction assisting device.

FIG. 2 is an example of an exterior view of the construction assisting device 1 according to the present embodiment.

In FIG. 2, an xyz space including three axes of an x axis, a y axis, and a z axis is assumed. The x axis, the y axis, and the z axis are orthogonal to one another. In the xyz space, a z-axis direction is the vertical direction. The z-axis direction is a collective term of a z1 direction and a z2 direction opposite to the z1 direction. The z1 direction is a vertically downward direction. The z2 direction is a vertically upward direction. An x axis direction is the same direction as a symmetry line of the construction assisting device 1 on an xy plane. The x-axis direction is a collective term of an x1 direction and an x2 direction opposite to the x1 direction. The x1 direction is a direction facing the front of the construction assisting device 1. The x2 direction is a direction facing the rear of the construction assisting device 1. More specifically, in the construction assisting device 1, of a first position where the information processing device 10 is provided and a second position where the projector 20 is provided, the first position is located in the x2 direction with respect to the second position. A y-axis direction is a collective term of a y1 direction and a y2 direction. The y1 direction is the right direction when the xy plane is viewed in the z1 direction with the x1 direction directed upward. The y2 direction is the left direction when the xy plane is viewed in the z1 direction with the x1 direction directed upward.

In FIG. 2, the construction assisting device 1 includes a cart PD. The cart PD includes wheels W1 and W2 on the surface in the z1 direction of the cart PD. The cart PD is movable on the road surface RS by including the wheels W1 and the wheels W2. The cart PD includes a handle HD. A user U of the construction assisting device 1 moves the cart PD on the road surface RS by gripping the handle HD and applying force to the cart PD.

The information processing device 10 and the projector 20 are placed on the cart PD in the z2 direction with respect to the cart PD. The information processing device 10 and the projector 20 are communicably connected to each other by a cable CB.

The information processing device 10 includes a main body unit 11 and a display device 150. The main body unit 11 includes a processing device 120 explained below. The display device 150 is placed on the main body unit 11 in the z2 direction.

The display device 150 is a device that displays images and character information. The display device 150 displays various images under control by the processing device 120. For example, various display panels such as a liquid crystal display panel and an organic EL (Electro Luminescence) display panel are suitably used as the display device 150.

The user U of the construction assisting device 1 can visually recognize various images and character information displayed on the display device 150 in a state of gripping the handle HD.

A rotary table RT is placed on the surface in the z2 direction of the cart PD. The rotary table RT is located in the x1 direction with respect to the information processing device 10. The rotary table RT rotates 360° centering on an axis in the z-axis direction.

The projector 20 is placed on the surface in the z2 direction of the rotary table RT. The projector 20 includes a main body unit 21 and a projection device 210. The main body unit 21 includes a processing device 220 explained below and at least a portion of the projection device 210. The main body unit 21 has, as an example, a cylindrical shape having the z-axis direction as a central axis. As an example, a part of the projection device 210 and an opening for emitting light from the projection device 210 are installed on the side surface of the main body unit 21.

The projection device 210 is a device that projects an image generated by the information processing device 10 onto the road surface RS. In the example illustrated in FIG. 2, the projection device 210 projects the image in the x1 direction. However, the projector 20 including the projection device 210 is placed on the rotary table RT. The projector 20 rotates on the rotary table RT. For this reason, the projector 20 is capable of projecting the image generated by the information processing device 10 in any direction among the x1 direction, the x2 direction, the y1 direction, and the y2 direction. Further, the projector 20 can project the image generated by the information processing device 10 in any direction between the x1 direction and the y2 direction, any direction between the y2 direction and the x2 direction, any direction between the x2 direction and the y1 direction, and any direction between the y1 direction and the x1 direction.

Figure 3:
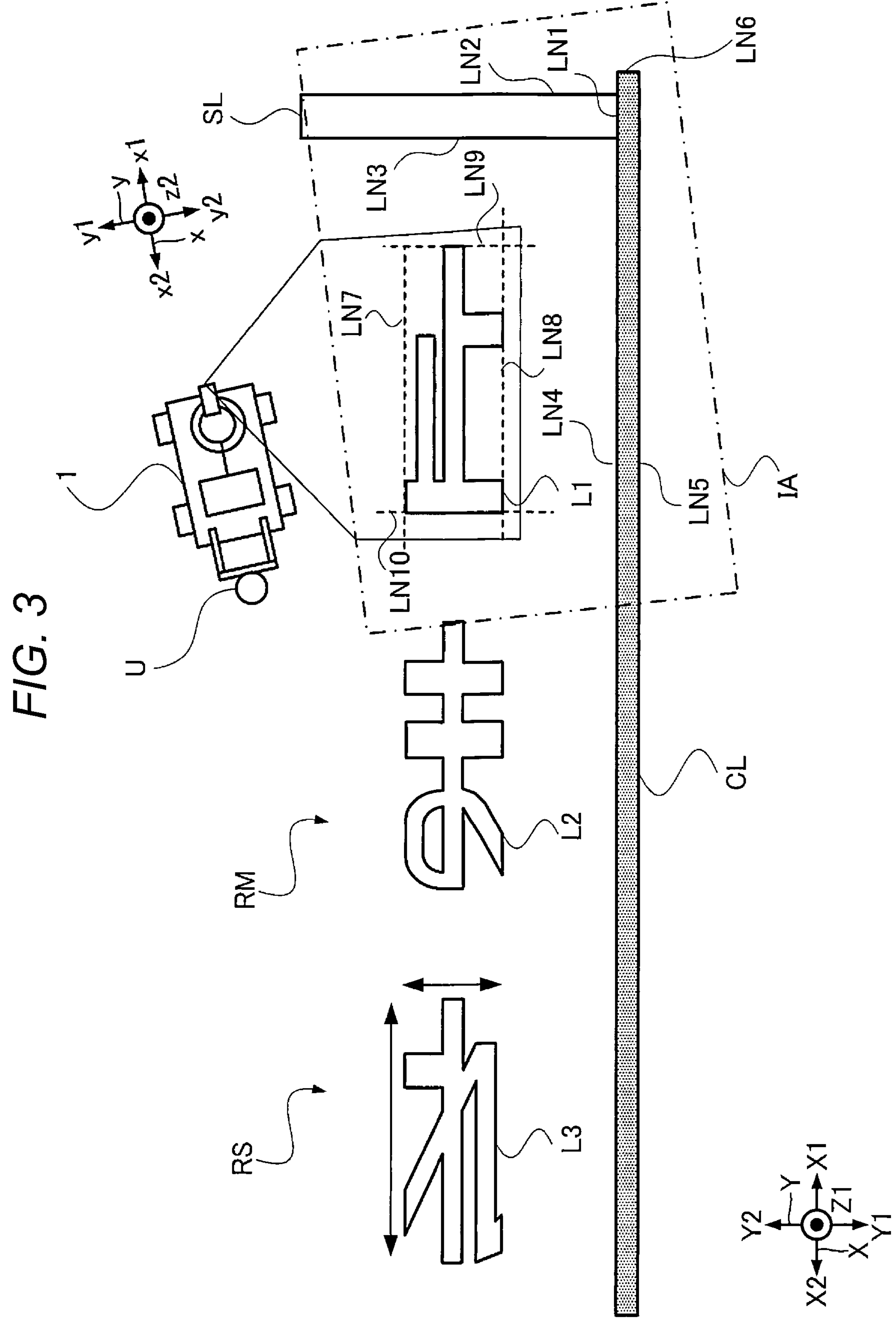
FIG. 3 is a diagram illustrating a projection example of an image showing a drawing pattern of a road marking on a road surface.

FIG. 3 is a diagram illustrating a projection example of an image showing a drawing pattern of the road marking RM on the road surface RS by the construction assisting device 1.

In FIG. 3, an XYZ space including three axes of an X axis, a Y axis, and a Z axis is assumed. The X axis, the Y axis, and the Z axis are orthogonal to one another. In the XYZ space, a Z-axis direction is the vertical direction. The Z-axis direction is a collective term of a Z1 direction and a Z2 direction opposite to the Z1 direction. The Z1 direction is a vertically downward direction. The Z2 direction is a direction directed vertically upward. The X-axis direction is an extending direction of a roadway center line CL drawn on the road surface RS. The X-axis direction is a collective term of an X1 direction and an X2 direction opposite to the X1 direction. The X1 direction is a direction toward the top of the road marking RM. The X2 direction is a direction facing the bottom of the road marking RM. The Y-axis direction is an extending direction of a stop line SL drawn on the road surface RS. The Y-axis direction is a collective term of a Y1 direction and a Y2 direction. The Y1 direction is the right direction when the road surface RS is viewed in the Z1 direction with the X1 direction directed upward. The Y2 direction is the left direction when the road surface RS is viewed in the Z1 direction with the X1 direction directed upward.

In the example illustrated in FIG. 3, the road marking RM includes three characters of a first character L1, a second character L2, and a third character L3. More specifically, in the example illustrated in FIG. 3, the road marking RM indicates three characters of "止まれ". The first character L1 indicates a character "止" of "止まれ". The second character L2 indicates a character "ま" of "止まれ". The third character L3 indicates a character "れ" of "止まれ". However, the road marking RM may include any number of characters. The road marking RM may be any characters. The road marking RM may include a figure other than characters. In FIG. 3, the second character L2 and the third character L3 are illustrated for explanation. In the present embodiment, an example in which construction is performed in order from the first character L1 is explained. Therefore, these two characters are not constructed on the road surface RS at a point in time when the first character L1 is projected. The user U can visually recognize, on the road surface RS, only an image of the first character L1 among the three characters.

The construction assisting device 1 projects one character of the road marking RM onto the road surface RS at a time. In the example illustrated in FIG. 3, the construction assisting device 1 projects a contour line of the first character L1 of the road marking RM in an area in the Y2 direction with respect to the roadway center line CL and in the X2 direction with respect to the stop line SL on the road surface RS. Details of a projection method for the contour line of the first character L1 by the construction assisting device 1 is explained below.

In FIGS. 2 and 3, the road surface RS may be an outdoor road surface or may be an indoor road surface. In FIGS. 2 and 3, the construction assisting device 1 projects the contour line of the first character L1 onto the road surface RS. However, this is merely an example. The construction assisting device 1 may project the contour line of the first character L1 onto a construction surface other than the road surface. For example, the construction assisting device 1 may project the contour line of the first character L1 onto a construction surface of a multistory parking space or a playing field.

1-2: Configuration of the Information Processing Device

Figure 4:
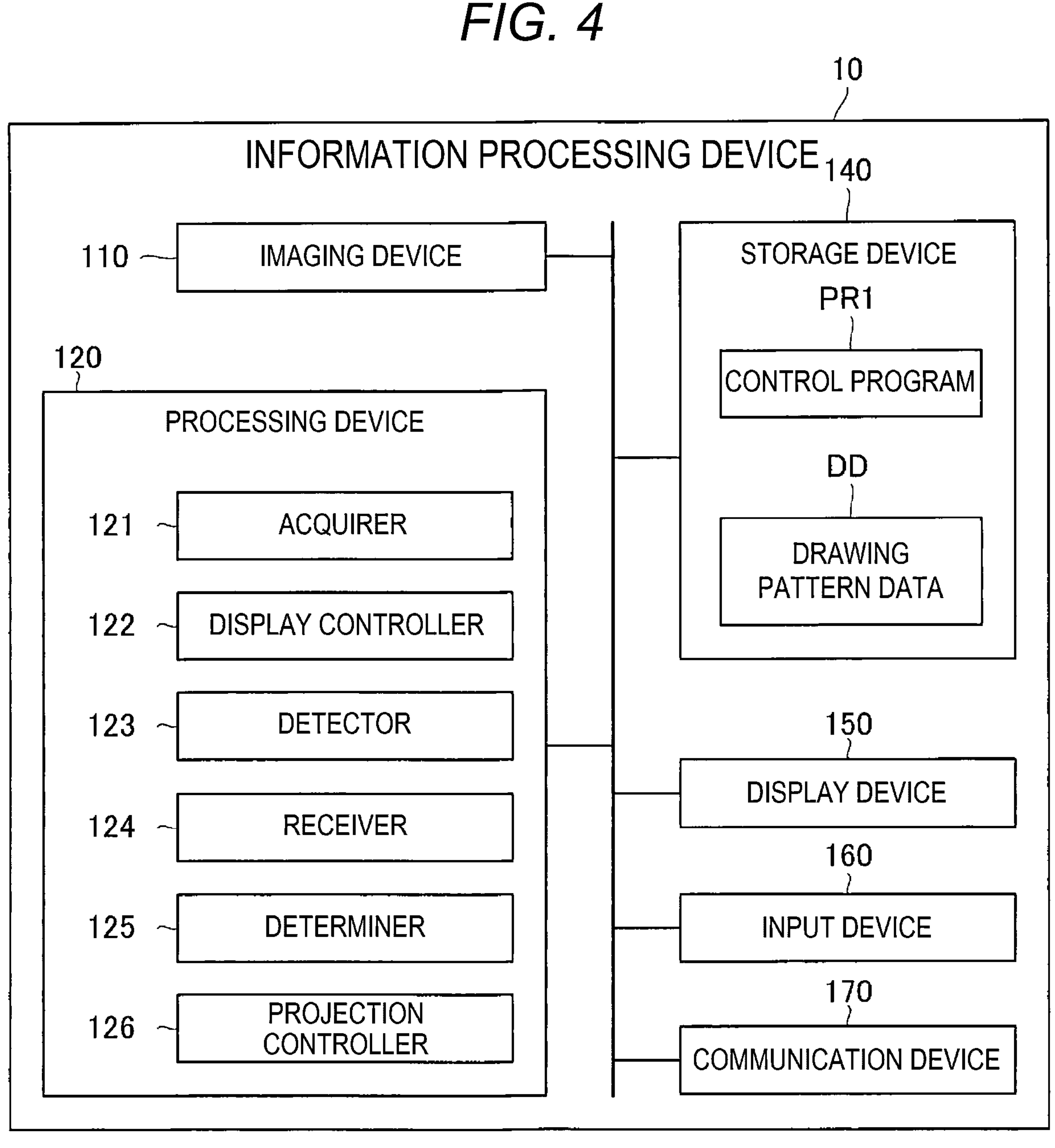
FIG. 4 is a block diagram illustrating a configuration example of an information processing device.

FIG. 4 is a block diagram illustrating a configuration of the information processing device 10. The information processing device 10 is typically a personal computer (PC), but is not limited to this and may be, for example, a tablet terminal or a smartphone. The information processing device 10 includes an imaging device 110, a processing device 120, a storage device 140, a display device 150, an input device 160, and a communication device 170. The elements of the information processing device 10 is connected to one another by a single bus or a plurality of buses for communicating information.

The imaging device 110 is a device that images the road surface RS. The imaging device 110 captures various images under control of the processing device 120. For example, a camera provided in a PC, a tablet terminal, or a smartphone is suitably used as the imaging device 110. However, the imaging device 110 is not limited to this and may be an external camera such as a WEB camera.

The processing device 120 is a processor that controls the entire information processing device 10 and includes, for example, a single chip or a plurality of chips. The processing device 120 includes, for example, a central processing unit (CPU) including an interface with a peripheral device, an arithmetic device, and a register. A part or all of the functions of the processing device 120 may be implemented by hardware such as a digital signal processor (DSP), an application specific integrated circuit (ASIC), a programmable logic device (PLD), or a field programmable gate array (FPGA). The processing device 120 executes various kinds of processing in parallel or sequentially.

The storage device 140 is a recording medium that can be read and written by the processing device 120 and stores a plurality of programs including a control program PR1 to be executed by the processing device 120 and drawing pattern data DD. The storage device 140 may include, for example, at least one of a read only memory (ROM), an erasable programmable ROM (EPROM), an electrical erasable programmable ROM (EEPROM), and a random access memory (RAM). The storage device 140 may be called register, cache, main memory, or main storage device.

The drawing pattern data DD is data concerning a drawing pattern. In the present embodiment, the drawing pattern is a contour line of the road marking RM. In the example illustrated in FIG. 3, the drawing pattern is a contour line of three characters "止まれ" that is the road marking RM. The drawing pattern includes contour lines of various road markings other than the road marking RM illustrated in FIG. 3.

As explained above, the display device 150 is a device that displays images and character information. The display device 150 may be a display device separate from the other elements of the information processing device 10.

The input device 160 is equipment that receives operation from the user U. For example, the input device 160 includes a pointing device such as a keyboard, a touch pad, a touch panel, or a mouse. When the input device 160 includes the touch panel, the input device 160 may also serve as the display device 150.

The communication device 170 is hardware serving as a transmission and reception device for communicating with other devices. The communication device 170 is also called, for example, network device, network controller, network card, or communication module. The communication device 170 may include a connector for wired connection and include an interface circuit corresponding to the connector. The communication device 170 may include a wireless communication interface. Examples of the connector for wired connection and the interface circuit include those conforming to a wired local area network (LAN), IEEE 1394, and a universal serial bus (USB). In addition, examples of the wireless communication interface include interfaces conforming to a wireless LAN or Bluetooth (registered trademark).

The processing device 120 reads the control program PR1 from the storage device 140 and executes the control program PR1 to thereby function as an acquirer 121, a display controller 122, a detector 123, a receiver 124, a determiner 125, and a projection controller 126. The control program PR1 may be transmitted from, via a communication network, another device such as a server that manages the information processing device 10.

The acquirer 121 acquires a captured image showing the road surface RS and an object on the road surface RS. The captured image is an image captured by the imaging device 110. Here, the "object on the road surface RS" includes at least one of a road marking painted on the road surface RS in advance, a structure fixed to the road surface RS, and an object, at least a part of which is a straight line, placed on the road surface RS. Here, the "road marking painted on the road surface RS in advance" is, for example, the roadway center line CL and the stop line SL illustrated in FIG. 3. The "structure fixed to the road surface RS" is, for example, a curb stone installed on the road surface RS. The curb stone suitably has a rectangular shape. The "object, at least a part of which is a straight line, placed on the road surface RS" is, for example, a ruler.

In the example illustrated in FIG. 3, the imaging device 110 images an imaging area IA on the road surface RS. The imaging area IA includes the road surface RS in the imaging area IA, a part of the roadway center line CL, and a part of the stop line SL. A part of the roadway center line CL and a part of the stop line SL correspond to the "object on the road surface RS" explained above.

The acquirer 121 acquires an image of the imaging area IA captured by the imaging device 110.

The display controller 122 causes the display device 150 to display a captured image IG acquired by the acquirer 121. The captured image IG displayed by the display device 150 is visually recognizable by the user U.

The detector 123 detects, from the captured image IG, a straight line included in an object on the road surface RS. For example, in FIG. 3, the detector 123 detects a straight line included in the contour of the roadway center line CL and a straight line included in the contour of the stop line SL in the imaging area IA.

The detector 123 detects an edge in the drawing pattern indicated by the drawing pattern data DD. As an example, the detector 123 divides the contour line of the road marking RM indicated by the drawing pattern into a plurality of line segments having the maximum length as long as the respective line segments do not bend and detects the line segments as one edge.

The receiver 124 receives operation of selecting, from the captured image IG, two parallel line segments indicating at least a part of the contour line of the object on the road surface RS. As explained above, the captured image IG is displayed on the display device 150. The user U uses the input device 160 to select the two parallel line segments indicating at least a part of the contour line of the object on the road surface RS. For example, the user U selects, on the touch panel serving as the input device 160 provided in the display device 150, the two parallel line segments indicating at least a part of the contour line of the roadway center line CL or the stop line SL displayed on the display device 150. The receiver 124 receives operation of selecting the two line segments by the user U. The two line segments are an example of a "first line segment".

When the user U selects the two line segments, the display controller 122 may cause the display device 150 to display the auxiliary image AI showing the two line segments.

As an example, the display controller 122 suitably sets the thickness of the auxiliary image AI to thickness different from the thicknesses of the two line segments included in the captured image IG. The display controller 122 suitably sets a color of the auxiliary image AI to a color different from a color of the two line segments included in the captured image IG. Specific examples of the captured image IG and the auxiliary image AI displayed on the display device 150 are explained below with reference to FIGS. 8 to 14.

The receiver 124 receives input indicating the distance between the two line segments. The distance is an example of a "first distance".

When the user U inputs the distance, the display controller 122 may cause the display device 150 to display the auxiliary image AI showing to a distance of which part the distance corresponds in the captured image. Further, the display controller 122 causes the display device 150 to display an input field of the distance.

As explained above, the construction assisting device 1 projects the projection image PI showing the drawing pattern onto the road surface RS. The projection image PI showing the drawing pattern includes a plurality of line segments indicating at least a part of the contour of the road marking RM. The receiver 124 receives operation of selecting two parallel line segments among the plurality of line segments from the projection image PI showing the drawing pattern. The two line segments are an example of a "second line segment". The projection image PI showing the drawing pattern is an example of a "first image".

When the user U selects the two line segments included in the projection image PI showing the drawing pattern, the display controller 122 may cause the display device 150 to display the auxiliary image AI showing the two line segments. As an example, the display controller 122 suitably sets the thickness of the auxiliary image AI to thickness different from the thicknesses of the two line segments included in the projection image PI showing the drawing pattern. The display controller 122 suitably sets a color of the auxiliary image AI to a color different from a color of the two line segments included in the projection image PI showing the drawing pattern.

The receiver 124 receives input indicating the distance between the two line segments included in the projection image PI showing the drawing pattern. The distance is an example of a "second distance".

When the user U inputs the distance, the display controller 122 may cause the display device 150 to display the auxiliary image AI showing to a distance of which part the distance corresponds in the projection image PI showing the drawing pattern. Further, the display controller 122 causes the display device 150 to display an input field of the distance between the two line segments included in the projection image PI showing the drawing pattern.

The determiner 125 determines, based on the object on the road surface RS included in the captured image IG, a position on the road surface RS onto which the projection image PI showing the drawing pattern is projected, the projection image PI being used for painting the road marking RM on the road surface RS. More specifically, the determiner 125 determines, based on two parallel line segments, which are selected by the user U, indicating at least a part of the contour line of the object on the road surface RS and the distance between the two line segments, the position on the road surface RS onto which the projection image PI showing the drawing pattern is projected.

In the present embodiment, the determiner 125 determines, further based on two parallel line segments, which are selected by the user U, indicating at least a part of the contour line of the road marking RM and the distance between the two line segments, the position on the road surface RS onto which the projection image PI showing the drawing pattern is projected.

A specific method, by the determiner 125, of determining the position on the road surface RS onto which the projection image PI showing the drawing pattern is projected is explained below with reference to FIGS. 6 to 15.

The projection controller 126 causes the projector 20 to project, at a position on the road surface RS determined by the determiner 125, the projection image PI showing the drawing pattern. More specifically, the projection controller 126 transmits, with the communication device 170, an image signal corresponding to the projection image PI showing the drawing pattern and a control signal for controlling the projector 20 to the projector 20.

1-3: Configuration of the Projector

Figure 5:
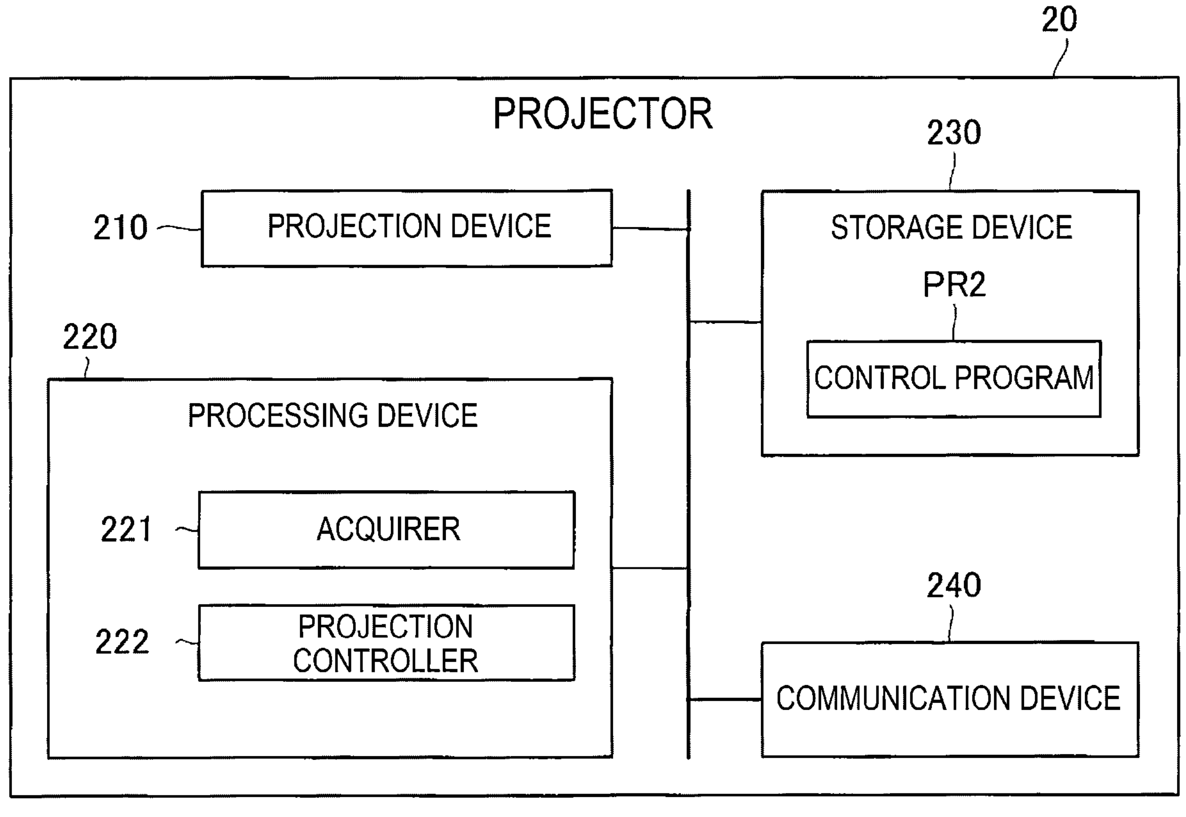
FIG. 5 is a block diagram illustrating a configuration example of a projector.

FIG. 5 is a block diagram illustrating a configuration example of the projector 20. The projector 20 includes a projection device 210, a processing device 220, a storage device 230, and a communication device 240. The elements of the projector 20 are connected to one another by a single bus or a plurality of buses for communicating information. The elements of the projector 20 may be configured by a single piece or a plurality of pieces of equipment, respectively. A part of the elements of the projector 20 may be omitted.

The projection device 210 is a device that projects an image indicated by an image signal acquired by an acquirer 221 explained below onto a screen, a wall, or the like. The projection device 210 projects various images under control of the processing device 220. The projection device 210 includes, for example, a light source, a liquid crystal panel, and a projection lens, modulates light from the light source using the liquid crystal panel, and projects the modulated light onto a screen, a wall, or the like via the projection lens.

The processing device 220 is a processor that controls the entire projector 20. The processing device 220 includes, for example, a single chip or a plurality of chips. The processing device 220 includes, for example, a central processing unit (CPU) including an interface with a peripheral device, an arithmetic device, and a register. A part or all of the functions of the processing device 220 may be implemented by hardware such as a digital signal processor (DSP), an application specific integrated circuit (ASIC), a programmable logic device (PLD), or a field programmable gate array (FPGA). The processing device 220 executes various kinds of processing in parallel or sequentially.

The storage device 230 is a recording medium readable by the processing device 220 and stores a plurality of programs including a control program PR2 to be executed by the processing device 220. The storage device 230 may include, for example, at least one of a read only memory (ROM), an erasable programmable ROM (EPROM), an electrical erasable programmable ROM (EEPROM), a random access memory (RAM), and the like. The storage device 230 may be called register, cache, main memory, main storage device, or the like.

The communication device 240 is hardware serving as a transmission and reception device for communicating with other devices. The communication device 240 is also called, for example, network device, network controller, network card, or communication module. The communication device 240 may include a connector for wired connection and include an interface circuit corresponding to the connector. The communication device 240 may include a wireless communication interface. Examples of the connector wired connection and the interface circuit include those conforming to a wired LAN, IEEE 1394, and USB. In addition, examples of the wireless communication interface include interfaces conforming to a wireless LAN or Bluetooth (registered trademark).]

The processing device 220 reads the control program PR2 from the storage device 230 and executes the control program PR2 to thereby function as an acquirer 221 and a projection controller 222. The control program PR2 may be transmitted from, via a communication network, another device such as a server that manages the projector 20.

The acquirer 221 acquires, from the information processing device 10, an image signal corresponding to the projection image PI showing the drawing pattern and a control signal for controlling the projector 20.

The projection controller 222 causes the projection device 310 to project the projection image PI showing the drawing pattern corresponding to the image signal acquired by the acquirer 221 onto the road surface RS based on the control signal acquired by the acquirer 221.

In the present embodiment, the projection device 210 is an example of an "optical device". The projector 20 is another example of the "optical device".

1-4: Projection Method for a Drawing Pattern

1-4-1: Projection Method for a First Character

Figure 6:
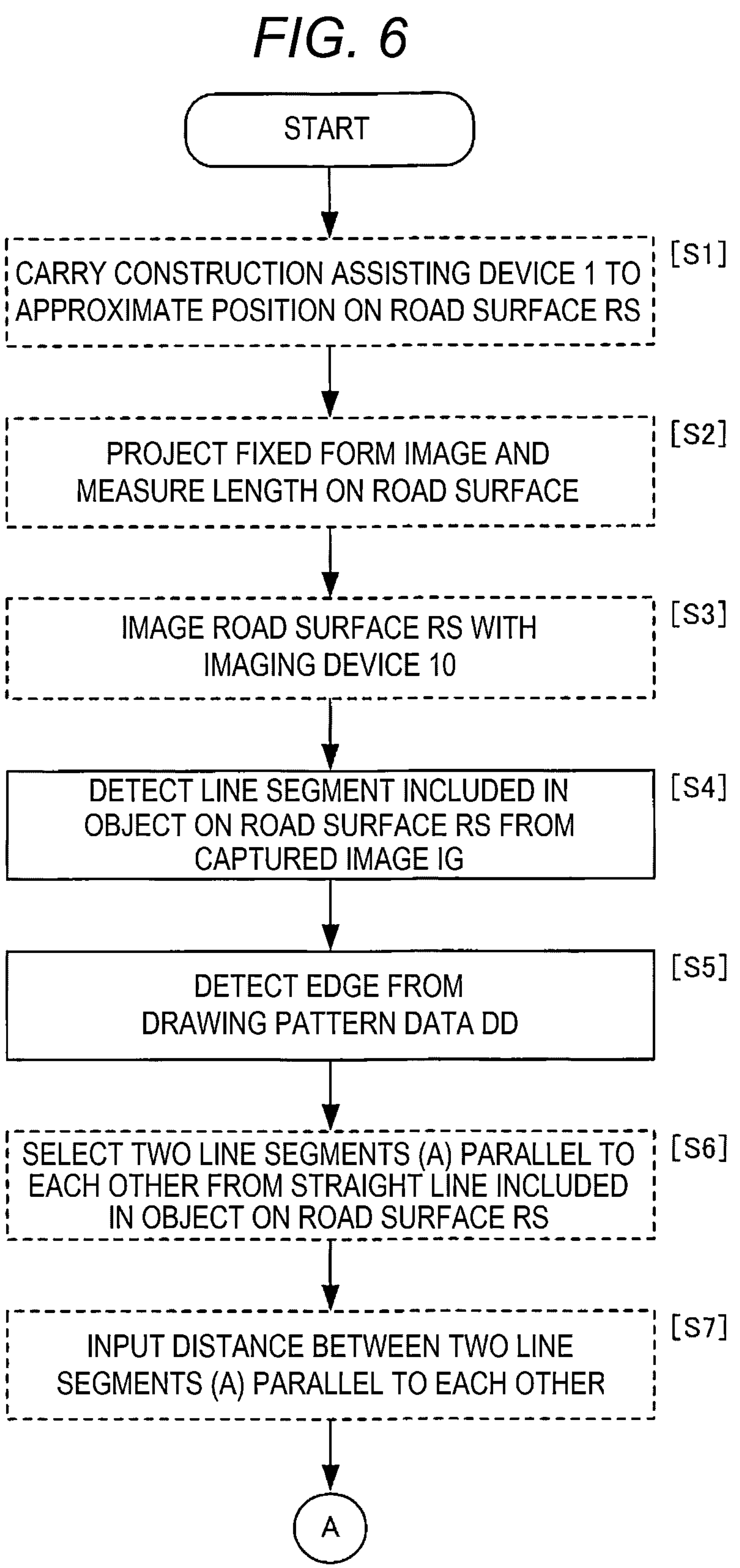
FIG. 6 is a flowchart illustrating a projection method for a projection image showing a drawing pattern by the construction assisting device.

FIGS. 6 and 7 are flowcharts illustrating a method, by the construction assisting device 1, of projecting the projection image PI showing the drawing pattern. More specifically, FIGS. 6 and 7 are flowcharts illustrating a projection method for the projection image PI corresponding to an image showing the first character L1 included in the drawing pattern. In FIGS. 6 and 7, steps including operations by the user U are indicated by dotted lines.

In step S1, the user U carries the construction assisting device 1 to an approximate position where the road marking RM is drawn on the road surface RS.

In step S2, the processing device 120 functions as the projection controller 126. The processing device 120 causes the projector 20 to project a fixed form image. The fixed form image is displayed in the center on the liquid crystal panel provided in the projection device 210 of the projector 20 and is projected onto the road surface RS. The fixed form image is, for example, a square. As an example, the user U measures the length of a diagonal line of the square projected onto the road surface RS. The user U inputs the length of the diagonal line to the information processing device 10 using the input device 160.

The processing device 120 functions as the acquirer 121. The processing device 120 acquires the length of the diagonal line input by the user U, more accurately, information indicating the length of the diagonal line input by the user U. Further, the processing device 120 calculates a correspondence relationship between the size of one pixel on the liquid crystal panel provided in the projection device 210 and the distance on the road surface RS from the length and the number of pixels of the diagonal line on the liquid crystal panel provided in the projection device 210.

In step S3, the user U images the road surface RS with the imaging device 110 provided in the information processing device 10. In step S3, the fixed form image in step S2 may not be projected. In the example illustrated in FIG. 3, the user U images the imaging area IA of the road surface RS with the imaging device 110. The processing device 120 functions as the acquirer 121. The processing device 120 acquires the captured image IG captured by the imaging device 110. When information indicating the length of the diagonal line is input in step S2, the processing device 120 may instruct the imaging device 110 to perform imaging.

In step S4, the processing device 120 functions as the detector 123. The processing device 120 detects a line segment included in an object on the road surface RS from the captured image IG. For example, referring to FIG. 3, the processing device 120 detects a line segment included in a part of the stop line SL and a line segment included in a part of the roadway center line CL in the object on the road surface RS included in the imaging area IA. More specifically, the processing device 120 detects a line segment LN1 extending in the X-axis direction and a line segment LN2 and a line segment LN3 extending in the Y-axis direction in a contour line of the stop line SL. The processing device 120 detects line segments LN4 and LN5 extending in the X-axis direction and a line segment LN6 extending in the Y-axis direction in the contour line of the roadway center line CL. The line segment LN1 to the line segment LN6 are an example of an "auxiliary image".

In step S5, the processing device 120 functions as the detector 123. The processing device 120 detects an edge from the projection image PI showing the drawing pattern projected onto the road surface RS. The processing device 120 detects the edge included in the projection image PI from the drawing pattern data DD. In step S5, the projection image PI may or may not be projected onto the road surface RS.

In step S6, the user U uses the input device 160 to select two parallel line segments (A) as reference lines from line segments included in the object on the road surface RS.

Figure 8:
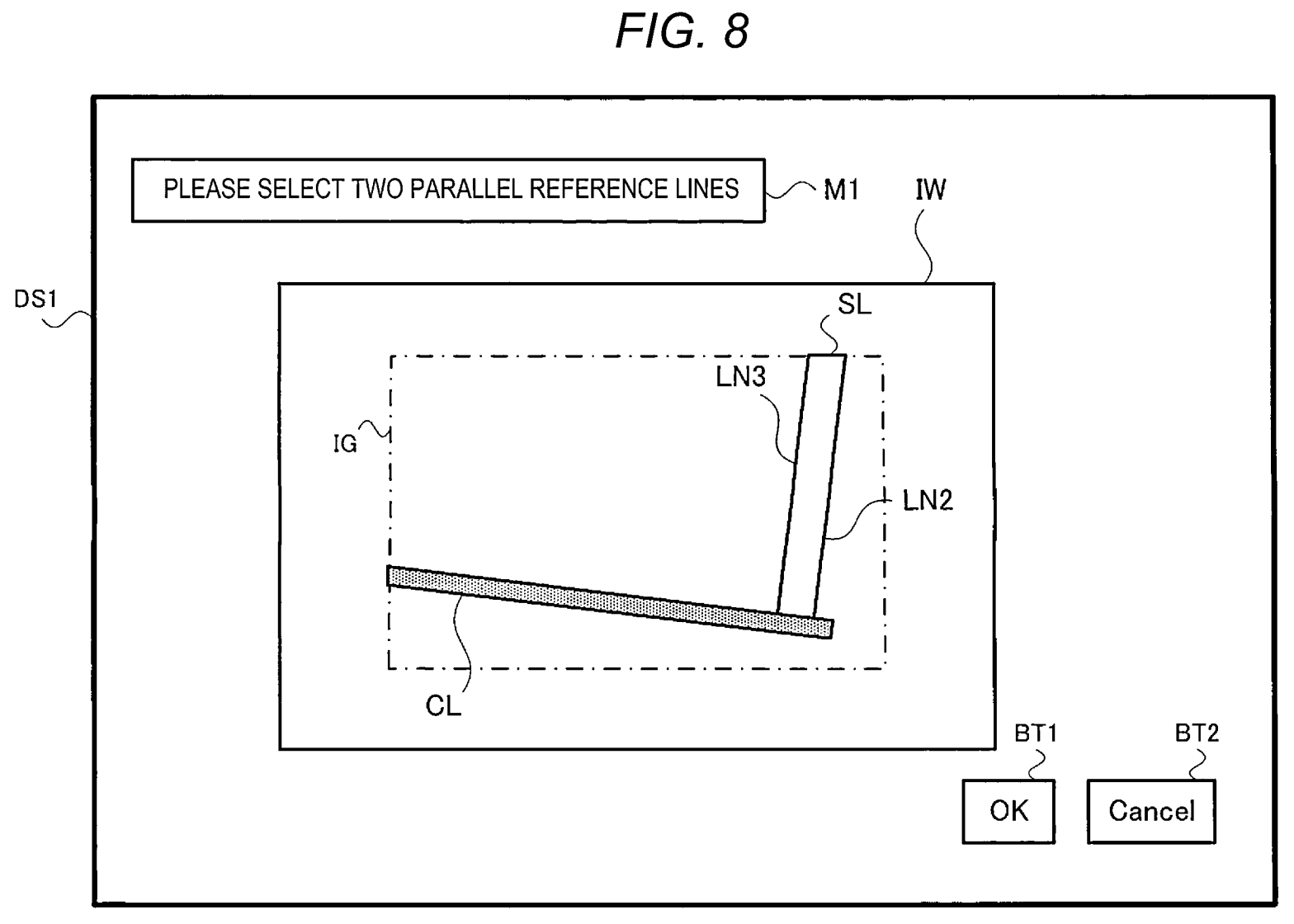
Figure 9:
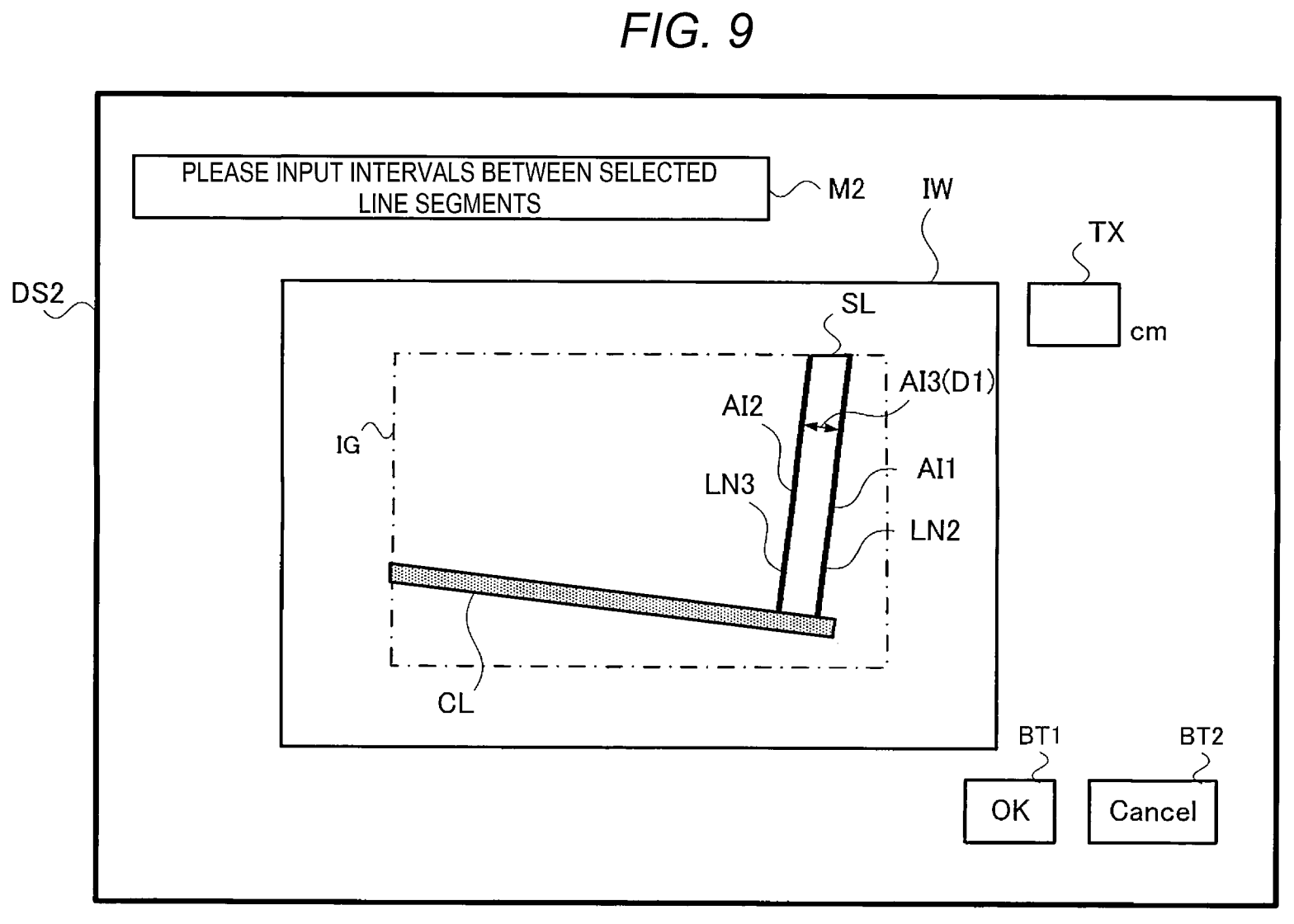

FIGS. 8 and 9 are examples of display screens displayed on the display device 150 in step S6. FIG. 8 illustrates a first display screen DS1. FIG. 9 illustrates a second display screen DS2.

The first display screen DS1 includes a message M1, an image display window IW, a first button BT1, and a second button BT2. On the first display screen DS1, the captured image IG is displayed on the image display window IW. The captured image IG is an image obtained by imaging the imaging area IA in FIG. 3 and includes the stop line SL and the roadway center line CL as objects on the road surface RS. In the first display screen DS1, the message M1 includes a message for urging the user U to select two line segments (A) parallel to each other from the line segments included in the object on the road surface RS included in the captured image IG. As an example, it is assumed that the user U has selected the line segment LN2 and the line segment LN3 included in the contour line of the stop line SL. Thereafter, since the selected line segments are the line segment LN2 and the line segment LN3 without problems, the user U presses or clicks the first button BT1 that is an "OK" button indicating approval. The second button BT2 is a cancel button.

As a result of the user U pressing or clicking the first button BT1, the second display screen DS2 is displayed on the display device 150. Although details of the second display screen DS2 are explained below, an auxiliary image AI1 for highlighting the line segment LN2 and an auxiliary image AI2 for highlighting the line segment LN3 are displayed on the second display screen DS2. In the auxiliary image AI1, a line is thicker compared with a line of the line segment LN2 and a color is different from a color of the line segment LN2. Similarly, in the auxiliary image AI2, a line is thicker compared with a line of the line segment LN3 and a color is different from a color of the line segment LN3.

When the user U selects the two line segments (A) in step S6, the processing device 120 functions as the receiver 124. The processing device 120 receives the two line segments (A) selected by the user U, more accurately, information indicating the two line segments (A) selected by the user U.

In step S7, the user U inputs the distance between the two line segments (A) selected in step S6. The distance between the two line segments (A) is a dimension between the two line segments (A) planned in a specification of the road marking RM to be constructed.

The second display screen DS2 illustrated in FIG. 9 includes a message M2, an image display window IW, a first button BT1, a second button BT2, and a text box TX. The message M2 includes a word for urging the user U to input a distance D1 between the two line segments (A). In the image display window IW, an auxiliary image AI3 indicating that a distance to be input is the distance D1 between the line segment LN2 and the line segment LN3 is displayed. The user U inputs the distance D1 between the two line segments (A) to the text box TX and presses or clicks the first button BT1.

In step S7, when the user U inputs the distance D1 between the two line segments (A), the processing device 120 functions as the receiver 124. The processing device 120 receives the distance D1 input by the user U, more accurately, information indicating the distance D1 input by the user U. Further, the processing device 120 calculates a correspondence relationship between an actual distance on the road surface RS and a distance on the display device 150.

In step S8, the user U selects two parallel line segments (B) from the drawing pattern.

Figure 10:
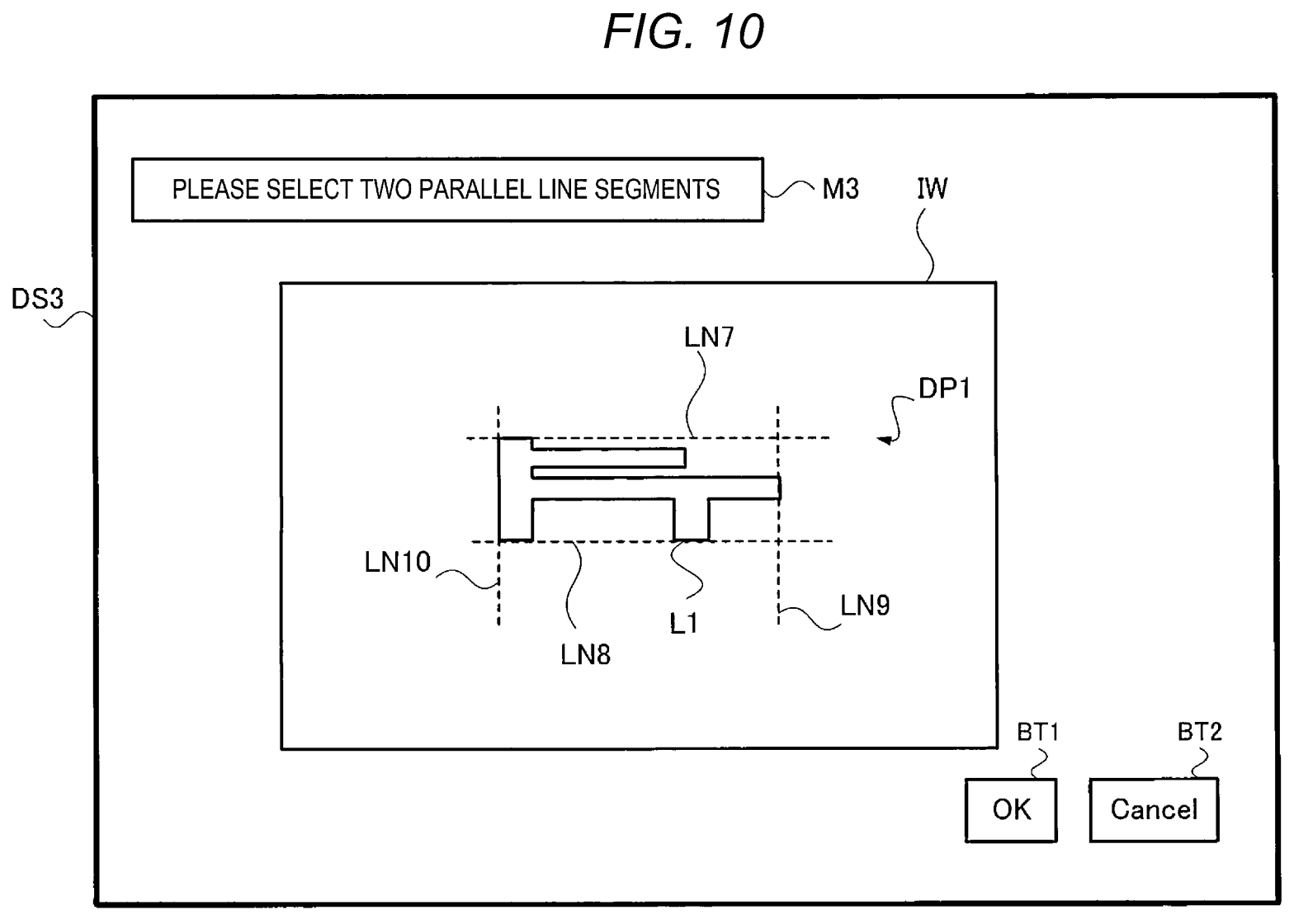
Figure 11:
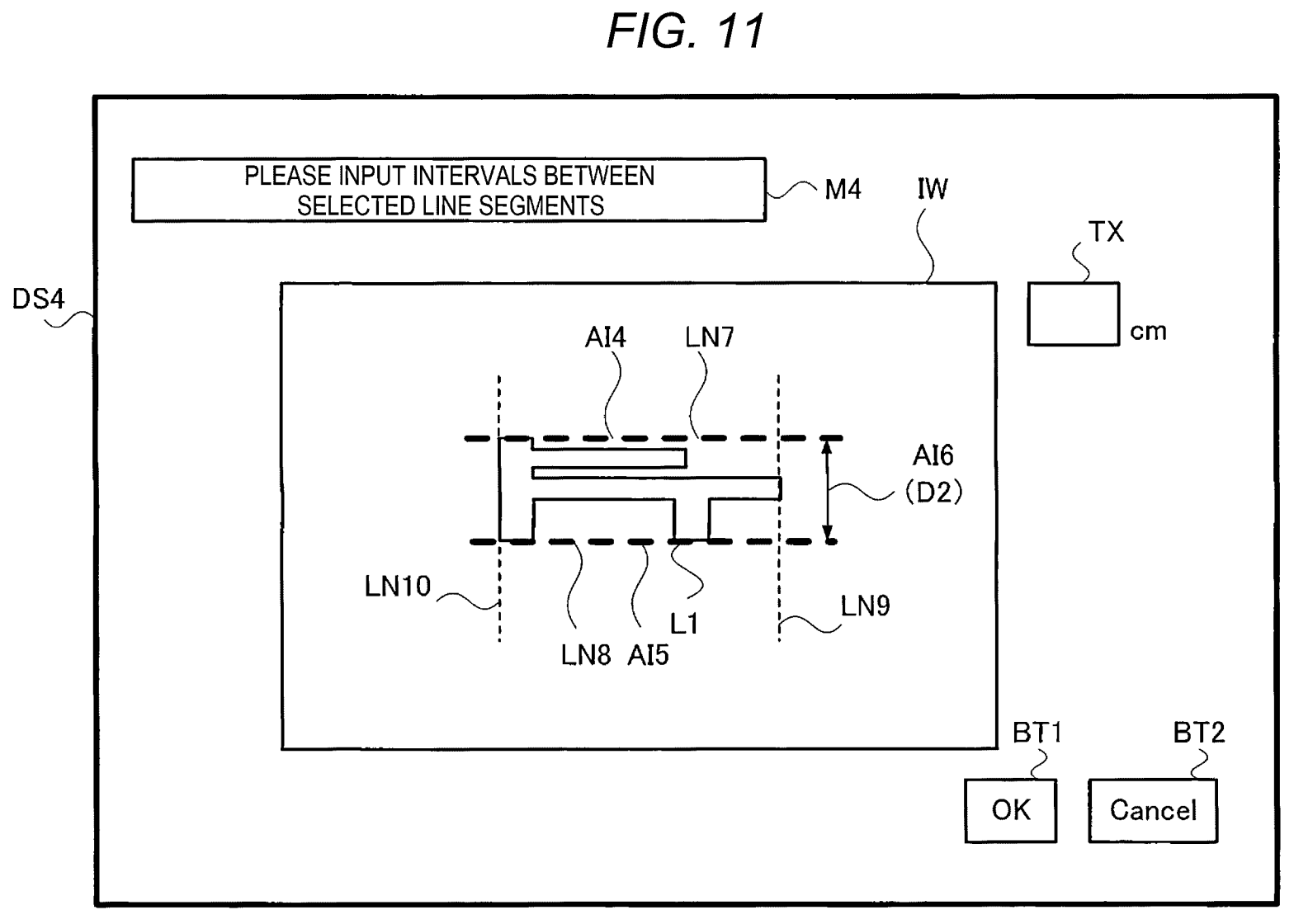

FIGS. 10 and 11 are examples of display screens displayed on the display device 150 in step S8. FIG. 10 illustrates a third display screen DS3. FIG. 11 illustrates a fourth display screen DS4.

The third display screen DS3 includes a message M3, the image display window IW, the first button BT1, and the second button BT2. In the third display screen DS3, an image DP1 showing a drawing pattern is displayed on the image display window IW. The image DP1 includes a contour line of the first character L1 included in the road marking RM and a line segment LN7 to a line segment LN10 indicating at least a part of the contour. The line segment LN7 and the line segment LN8 are parallel to each other and extend in the height direction of the first character L1. The distance between the line segment LN7 and the line segment LN8 corresponds to the width of the first character L1. The line segment LN9 and the line segment LN10 are parallel to each other and extend in the width direction of the first character L1. The distance between the line segment LN9 and the line segment LN10 corresponds to the height of the first character L1. The message M3 includes a message for urging the user U to select two line segments (B) parallel to each other from a plurality of line segments included in the image DP1. As an example, it is assumed that the user U has selected the line segment LN7 and the line segment LN8 from the line segment LN7 to the line segment LN10. Thereafter, since the selected line segments are the line segment LN7 and the line segment LN8 without problems, the user U presses or clicks the first button BT1 that is an “OK” button indicating approval. The line segment LN7 to the line segment LN10 are an example of an “auxiliary image”.

As a result of the user U pressing or clicking the first button BT1, the fourth display screen DS4 is displayed on the display device 150. Details about the fourth display screen DS4 are explained below. On the fourth display screen DS4, an auxiliary image AI4 for highlighting the line segment LN7 and an auxiliary image AI5 for highlighting the line segment LN8 are displayed. In the auxiliary image AI4, a line is thicker compared with a line of the line segment LN7 and a color is different from a color of the line segment LN7. Similarly, in the auxiliary image AI5, a line is thicker compared with a line of the line segment LN8 and a color is different from a color of the line segment LN8.

When the user U selects the two line segments (B) in step S8, the processing device 120 functions as the receiver 124. The processing device 120 receives the two line segments (B) selected by the user U, more accurately, information indicating the two line segments (B) selected by the user U.

In step S9, the user U inputs an actual distance on the road surface RS between the two line segments (B) selected in step S8. The distance between the two line segments (B) is a dimension between the two line segments (B) planned as a specification of the road marking RM to be constructed.

The fourth display screen DS4 illustrated in FIG. 11 includes a message M4, the image display window IW, the first button BT1, the second button BT2, and the text box TX. The message M4 includes a word for urging the user U to input the actual distance between the two line segments (B) on the road surface RS. On the image display window IW, an auxiliary image AI6 indicating that a distance to be input is a distance D2 between the line segment LN7 and the line segment LN8 is displayed. The user U inputs the actual distance between the two line segments (B) to the text box TX and presses or clicks the first button BT1.

When the user U inputs the actual distance between the two line segments (B) in step S9, the processing device 120 functions as the receiver 124. The processing device 120 receives the distance D2 input by the user U, more accurately, information indicating the distance D2 input by the user U.

In step S10, the processing device 120 functions as the determiner 125. The processing device 120 calculates the number of pixels between the two line segments (B) on the liquid crystal panel of the projection image PI showing the first character L1 included in the drawing pattern based on the correspondence relationship between the size of one pixel on the liquid crystal panel of the projection device 210 calculated in step S2 and the distance on the road surface RS and the distance D1 between the two line segments (B) on the road surface RS received in step S9. Further, the processing device 120 determines magnification of the projection image PI from the number of pixels between the two line segments (B) on the liquid crystal panel and the calculated number of pixels in the case in which the projection image PI is set to equal magnification.

In step S11, the user U selects two line segments (C) parallel to each other from each of the image showing the drawing pattern and the captured image IG.

Figure 12:
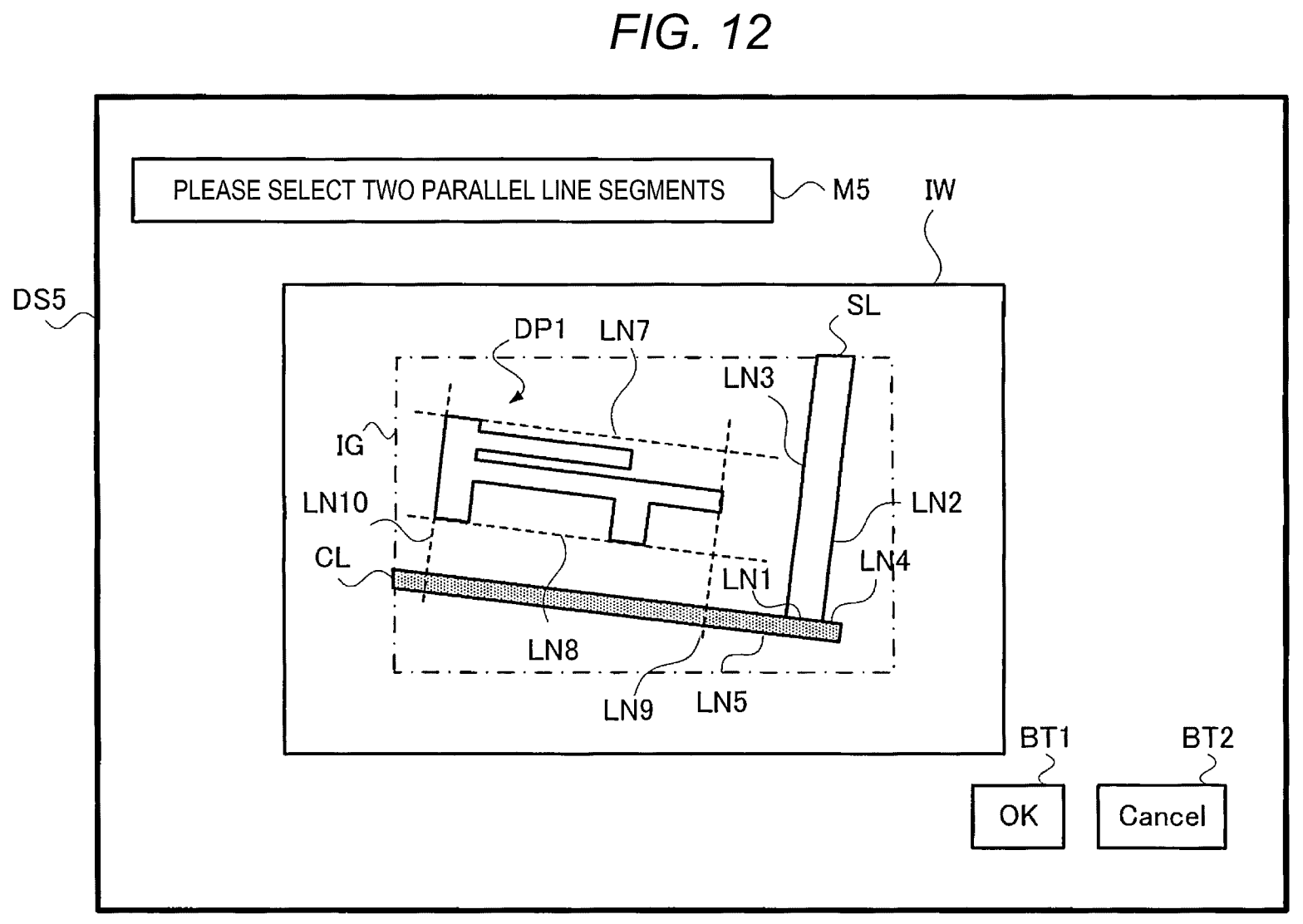
Figure 13:
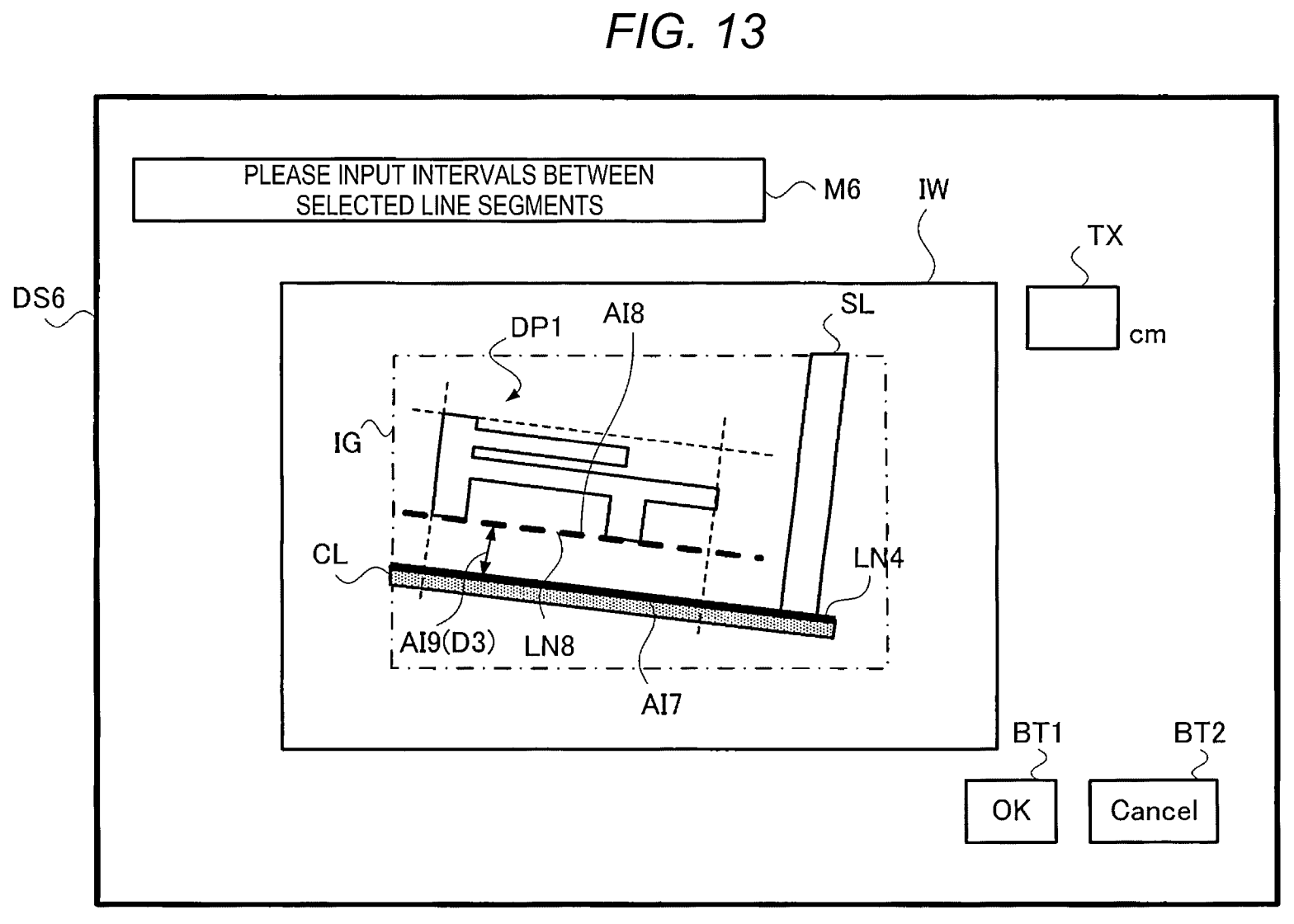

FIGS. 12 and 13 are examples of display screens displayed on the display device 150 in step S11. FIG. 12 illustrates a fifth display screen DS5. FIG. 13 illustrates a sixth display screen DS6.

The fifth display screen DS5 includes a message M5, the image display window IW, the first button BT1, and the second button BT2. In the fifth display screen DS5, the captured image IG and the image DP1 showing the drawing pattern are superimposed and displayed on the image display window IW. In the superimposed display, a size of the image DP1 on the display device 150 is calculated based on the correspondence relationship between the actual distance on the road surface RS calculated in step S7 and the distance on the display device 150 and the actual distance received in step S9. In the superimposed display, the image DP1 is arranged at an angle at which the line segment LN2, the line segment LN3, the line segment LN9, and the line segment LN10 are parallel to one another and the line segment LN1, the line segment LN4, the line segment LN5, the line segment LN7, and the line segment LN8 are parallel to one another. The message M5 includes a word for urging the user U to select two line segments (C) parallel to each other from a plurality of line segments included in the captured image IG and the plurality of line segments included in the image DP1. For example, it is assumed that the user U has selected the line segment LN4 and the line segment LN8. Thereafter, since the selected line segments are the line segment LN4 and the line segment LN8 without problems, the user U presses or clicks the first button BT1 that is an “OK” button indicating approval.

As a result of the user U pressing or clicking the first button BT1, a sixth display screen DS6 is displayed on the display device 150. Details about the sixth display screen DS6 are explained below. On the sixth display screen DS6, an auxiliary image AI7 for highlighting the line segment LN4 and an auxiliary image AI8 for highlighting the line segment LN8 are displayed. In the auxiliary image AI7, a line is thicker compared with a line of the line segment LN4 and a color is different from a color of the line segment LN4. Similarly, in the auxiliary image AI8, a line is thicker compared with a line of the line segment LN8 and a color is different from a color of the line segment LN8.

When the user U selects the two line segments (C) in step S11, the processing device 120 functions as the receiver 124. The processing device 120 receives the two line segments (C) selected by the user U, more accurately, information indicating the two line segments (C) selected by the user U.

In step S12, the user U inputs an actual distance on the road surface RS between the two line segments (C) selected in step S11. The distance between the two line segments (C) is a dimension between the two line segments (C) planned as a specification of the road marking RM to be constructed.

The sixth display screen DS6 illustrated in FIG. 13 includes a message M6, the image display window IW, the first button BT1, the second button BT2, and the text box TX. The message M6 includes a word for urging the user U to input the actual distance between the two line segments (C) on the road surface RS. On the image display window IW, an auxiliary image AI9 indicating that a distance to be input is a distance D3 between the line segment LN4 and the line segment LN8 is displayed. The user U inputs the actual distance between the two line segments (C) to the text box TX and presses or clicks the first button BT1.

When the user U inputs the actual distance between the two line segments (C) in step S12, the processing device 120 functions as the receiver 124. The processing device 120 receives the distance D3 input by the user U, more accurately, information indicating the distance D3 input by the user U.

In step S13, the user U selects two line segments (D) perpendicular to the two line segments (C) and parallel to each other from each of the drawing pattern and the captured image IG.

FIG. 14 is an example of a display screen displayed on the display device 150 in step S13. In step S13, the same screen as the fifth display screen DS5 illustrated in FIG. 12 and a seventh display screen DS7 illustrated in FIG. 14 are displayed.

It is assumed that the user U selects the line segment LN3 and the line segment LN9 on the fifth display screen DS5 as two line segments perpendicular to the line segment LN4 and the line segment LN8 selected in step S11 and parallel to each other. Thereafter, since the selected line segments are the line segment LN3 and the line segment LN9 without problems, the user U presses or clicks the first button BT1 that is an "OK" button indicating approval.

As a result of the user U pressing or clicking the first button BT1, the seventh display screen DS7 is displayed on the display device 150. Details about the seventh display screen DS7 are explained below. On the seventh display screen DS7, an auxiliary image AI10 for highlighting the line segment LN3 and an auxiliary image AI11 for highlighting the line segment LN9 are displayed. In the auxiliary image AI10, a line is thicker compared with a line of the line segment LN3 and a color is different from a color of the line segment LN3. Similarly, in the auxiliary image AI11, a line is thicker compared with a line of the line segment LN9 and a color is different from a color of the line segment LN9.

When the user U selects the two line segments (D) in step S13, the processing device 120 functions as the receiver 124. The processing device 120 receives the two line segments (D) selected by the user U, more accurately, information indicating the two line segments (D) selected by the user U.

In step S14, the user U inputs an actual distance on the road surface RS between the two line segments (D) selected in step S13. The distance between the two line segments (D) is a dimension between the two line segments (D) planned as a specification of the road marking RM to be constructed.

The seventh display screen DS7 illustrated in FIG. 14 includes a message M7, the image display window IW, the first button BT1, the second button BT2, and the text box TX. The message M7 includes a word for urging the user U to input the actual distance between the two line segments (D) on the road surface RS. On the image display window IW, an auxiliary image AI12 indicating that a distance to be input is a distance D4 between the line segment LN3 and the line segment LN9 is displayed. The user U inputs the actual distance between the two line segments (D) to the text box TX and presses or clicks the first button BT1.

When the user U inputs the actual distance between the two line segments (D) in step S14, the processing device 120 functions as the receiver 124. The processing device 120 receives the distance D4 input by the user U, more accurately, information indicating the distance D4 input by the user U.

In step S15, the processing device 120 functions as the determiner 125. The processing device 120 determines an angle and a position of an image showing the first character L1 included in the drawing pattern on the road surface RS based on the actual distance between the two line segments (C) received in step S12, the actual distance between the two line segments (D) received in step S14, an inclination of the two line segments (C), and an inclination of the two line segments (D). Further, the processing device 120 determines, based on the angle and the position on the road surface RS of the image representing the first character L1 included in the drawing pattern, an angle and a position on the panel provided in the projection device 210 of the projection image PI showing the first character L1.

In step S16, the processing device 120 functions as the projection controller 126. The processing device 120 causes the projector 20 to project the projection image PI onto the road surface RS at the magnification determined in step S10 and the angle and the position determined in step S15. As an example, the user U draws a line on the road surface RS with a chalk along a contour line of the first character L1 projected on the road surface RS. Subsequently, the road surface RS is painted based on the line of the chalk to construct a road marking of the first character L1 on the road surface RS. When painting is applied, the projection of the projection image PI by the projector 20 may have been ended. As another example, the user U may omit work of drawing the line of the chalk and may paint the road surface RS based on the contour line of the first character L1 projected on the road surface RS. The methods explained above may be properly used according to complexity of characters and figures, a positional relationship between light from the projector 20 and the user U or the painting machine, and the like.

1-4-2: Method for Projecting Second and Subsequent Characters

As explained above, in the projection method for the projection image PI corresponding to the first character L1, the line segment LN7 to the line segment LN10 indicating at least a part of the contour line of the first character L1 is used in order to determine the magnification of the projection image PI. In addition, in the projection method, in order to determine the angle and the position of the projection image PI on the liquid crystal panel provided in the projection device 210, the line segment LN7 to the line segment LN10 indicating at least a part of the contour line of the first character L1, the contour line of the stop line SL, and the contour line of the roadway center line CL are used.

In the projection method for the projection image PI corresponding to the second character L2 included in the road marking RM, generally, in order to determine the magnification of the projection image PI, a line segment LN12 to a line segment LN15 indicating at least a part of the contour line of the second character L2 is used. In the projection method, in order to determine the angle and the position of the projection image PI on the liquid crystal panel provided in the projection device 210, the line segment LN12 to the line segment LN15 indicating at least a part of the contour line of the second character L2, the line segment LN7 to the line segment LN10 indicating at least a part of the contour line of the first character L1, and the contour line of the roadway center line CL are used.

In other words, in the projection method for the projection image PI corresponding to the second character L2 included in the road marking RM, the line segment LN12 to line segment LN15 indicating at least a part of the contour line of the second character L2 are used instead of the line segment LN7 to line segment LN10 indicating at least a part of the contour line of the first character L1 in the projection method for the projection image P corresponding to the first character L1 and the line segment LN7 to line segment LN10 indicating at least a part of the contour line of the first character L1 is used instead of the contour of the stop line SL in the projection method for the projection image P corresponding to the first character L1. The same applies to third and subsequent characters.

Figure 15:
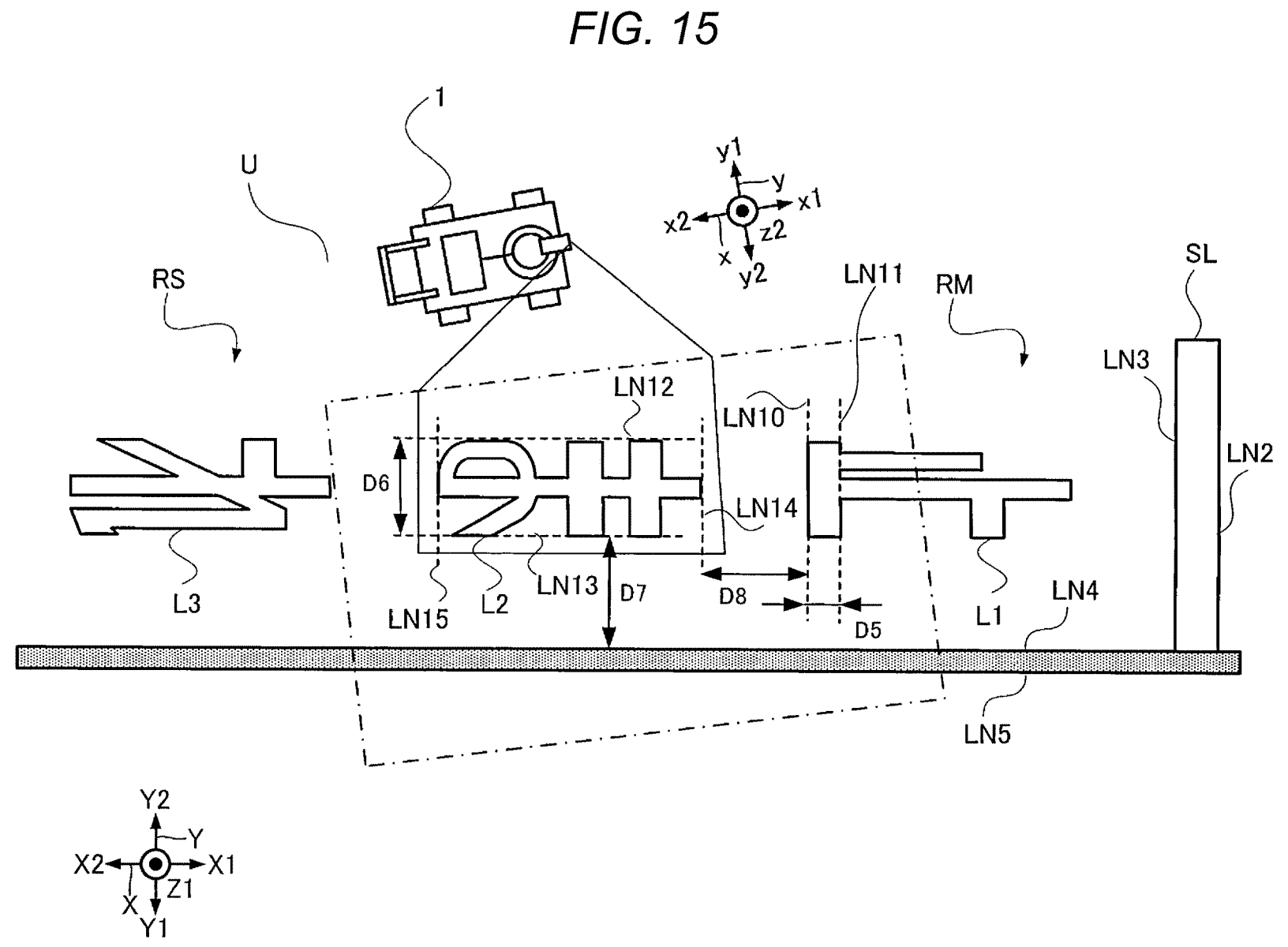

FIG. 15 is a diagram illustrating a projection example of an image showing a drawing pattern of the road marking RM on the road surface RS by the construction assisting device 1. In FIG. 3, the construction assisting device 1 projects the image corresponding to the first character L1. However, in FIG. 15, the construction assisting device 1 projects an image corresponding to the second character L2. At a point in time of FIG. 15, since painting of the first character L1 on the road surface RS has been completed, the first character L1 can be used as an object on the road surface RS like the stop line SL. In addition, as in FIG. 3, the third character L3 is illustrated for explanation. However, the third character L3 is absent on the road surface RS before construction.

In FIG. 15, the line segment LN10 and the line segment LN11 indicate at least a part of the contour line of the first character L1. The line segment LN10 and the line segment LN11 are parallel to each other and extend in the width direction of the first character L1. The line segment LN11 is located in the X1 direction with respect to the line segment LN10. A distance D5 between the line segment LN10 and the line segment LN11 corresponds to the thickness of the fourth stroke of the first character L1. The thickness is the thickness in the height direction of the first character L1.

The line segment LN12 to the line segment LN15 indicate at least a part of the contour line of the second character L2. The line segment LN12 and the line segment LN13 are parallel to each other and extend in the height direction of the second character L2. The line segment LN13 is located in the Y1 direction with respect to the line segment LN12. A distance D6 between the line segment LN12 and the line segment LN13 corresponds to the width of the second character L2. The line segment LN14 and the line segment LN15 are parallel to each other and extend in the width direction of the first character L2. The line segment LN15 is located in the X2 direction with respect to the line segment LN14. The distance between the line segment LN14 and the line segment LN15 corresponds to the height of the second character L2.

In the projection method for the projection image PI corresponding to the second character L2, each of the line segment LN11 and the line segment LN10 is used instead of each of the line segment LN2 and the line segment LN3 in the projection method for the projection image PI corresponding to the first character L1. In the projection method for the projection image PI corresponding to the second character L2, each of the line segment LN12 to the line segment LN15 is used instead of each of the line segment LN7 to the line segment LN10 in the projection method for the projection image PI corresponding to the first character L1. In the projection method for the projection image PI corresponding to the second character L2, the distance D5 between the line segment LN10 and the line segment LN11 is used instead of the distance D1 in the projection method for the projection image PI corresponding to the first character L1. In the projection method for the projection image PI corresponding to the second character L2, the distance D6 between the line segment LN12 and the line segment LN13 is used instead of the distance D2 in the projection method for the projection image PI corresponding to the first character L1. In the projection method for the projection image PI corresponding to the second character L2, a distance D7 between the line segment LN4 and the line segment LN13 is used instead of the distance D3 in the projection method for the projection image PI corresponding to the first character L1. In the projection method for the projection image PI corresponding to the second character L2, a distance D8 between the line segment LN10 and the line segment LN14 is used instead of the distance D4 in the projection method for the projection image PI corresponding to the first character L1.

1-5: Effects Achieved by the First Embodiment

With the construction assisting method according to the present embodiment, a construction assisting method for a road marking having less restriction on a place where the construction assisting method can be used compared with a method of positioning using a satellite signal is provided. In addition, since the user U of the construction assisting device 1 can optionally select a drawing pattern and an object on the road surface RS for determining a position of an image showing the drawing pattern on the road surface RS, the user U can determine an optimum method for each construction site. The imaging area IA by the construction assisting device 1 can be made compact. Further, the user U is not required to have an advanced IT skill.

2: SECOND EMBODIMENT

A construction assisting device 1A according to the present embodiment is explained below with reference to FIGS. 16 to 24. Note that, in the following explanation, for simplification of explanation, differences of the construction assisting device 1A from the construction assisting device 1 are mainly explained. Among elements provided in the construction assisting device 1A, the same elements as the components provided in the construction assisting device 1 are denoted by the same reference numerals and signs and explanation of functions of the elements is sometimes omitted.

In the construction assisting device 1 according to the first embodiment, the projection image PI showing the drawing pattern mainly has the image showing the contour line of the road marking RM. In the construction assisting device 1A according to the present embodiment, the projection image PI showing the drawing pattern includes an image showing an object on the road surface RS in addition to the image showing the contour line of the road marking RM. The object on the road surface RS includes at least one of a road marking painted on the road surface RS in advance and a structure fixed to the road surface RS. The road marking painted on the road surface RS in advance is, for example, the roadway center line CL and the stop line SL. The construction assisting device 1A according to the present embodiment executes pattern matching between an image showing an object on the road surface RS included in an image showing a drawing pattern and a region of the object on the road surface RS included in the captured image IG to determine magnification, an angle, and a position of the projection image PI.

2-1: Overall Configuration

The construction assisting device 1A according to the present embodiment includes an information processing device 10A instead of the information processing device 10. Otherwise, the construction assisting device 1A has the same overall configuration as the overall configuration of the construction assisting device 1 illustrated in FIG. 1. Therefore, illustration of the overall configuration is omitted.

Figure 16:
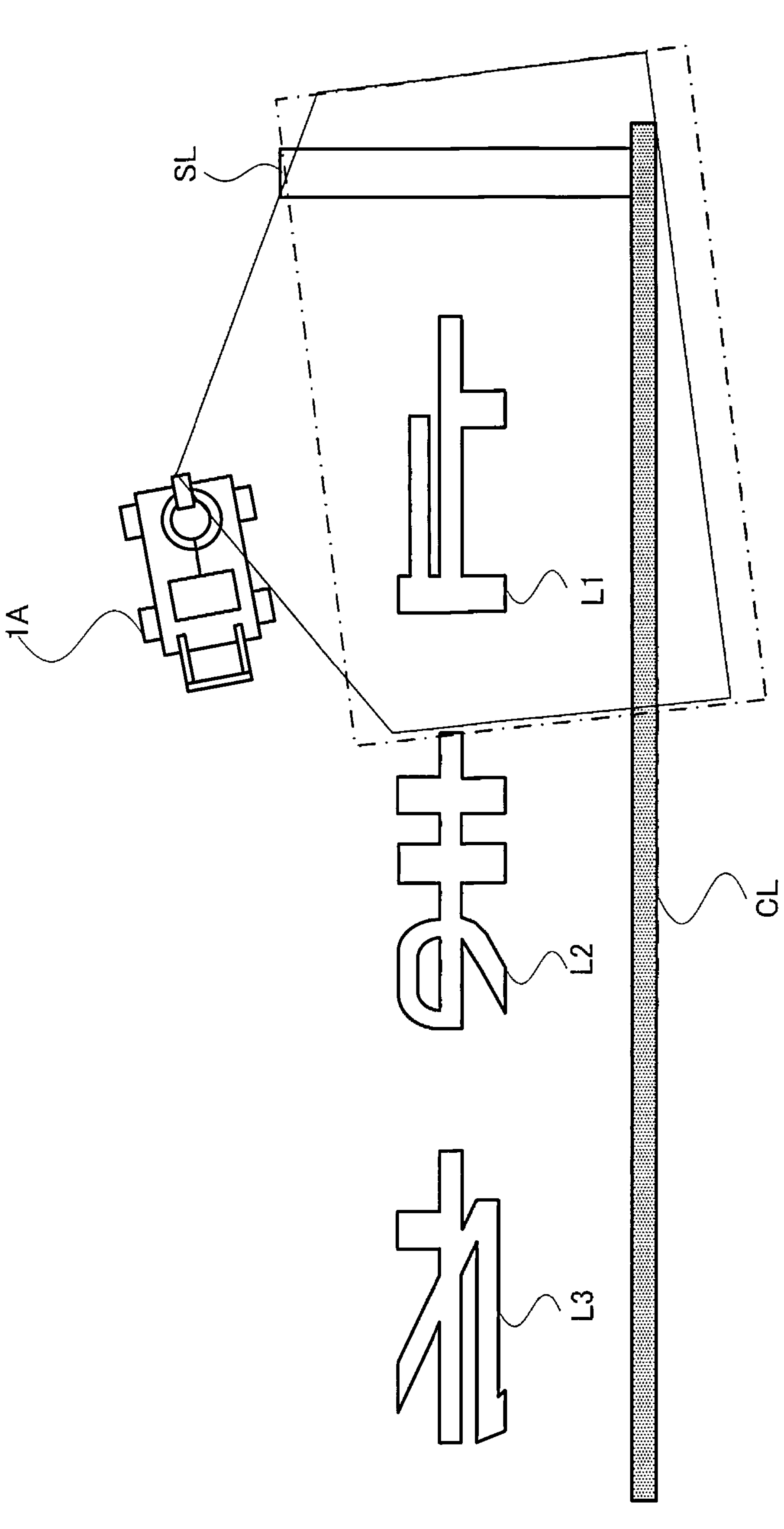
FIG. 16 is a diagram illustrating a projection example of an image showing a drawing pattern of the road marking on the road surface.

FIG. 16 is a diagram illustrating a projection example of an image showing a drawing pattern of the road marking RM on the road surface RS by the construction assisting device 1A. As illustrated in FIG. 16, the present embodiment is based on the premise that a projection range by the construction assisting device 1A includes an object on the road surface RS. The example illustrated in FIG. 16 is based on the premise that the projection range includes a part of the roadway center line CL and a part of the stop line SL as the object on the road surface RS.

2-2. Configuration of the Information Processing Device

Figure 17:
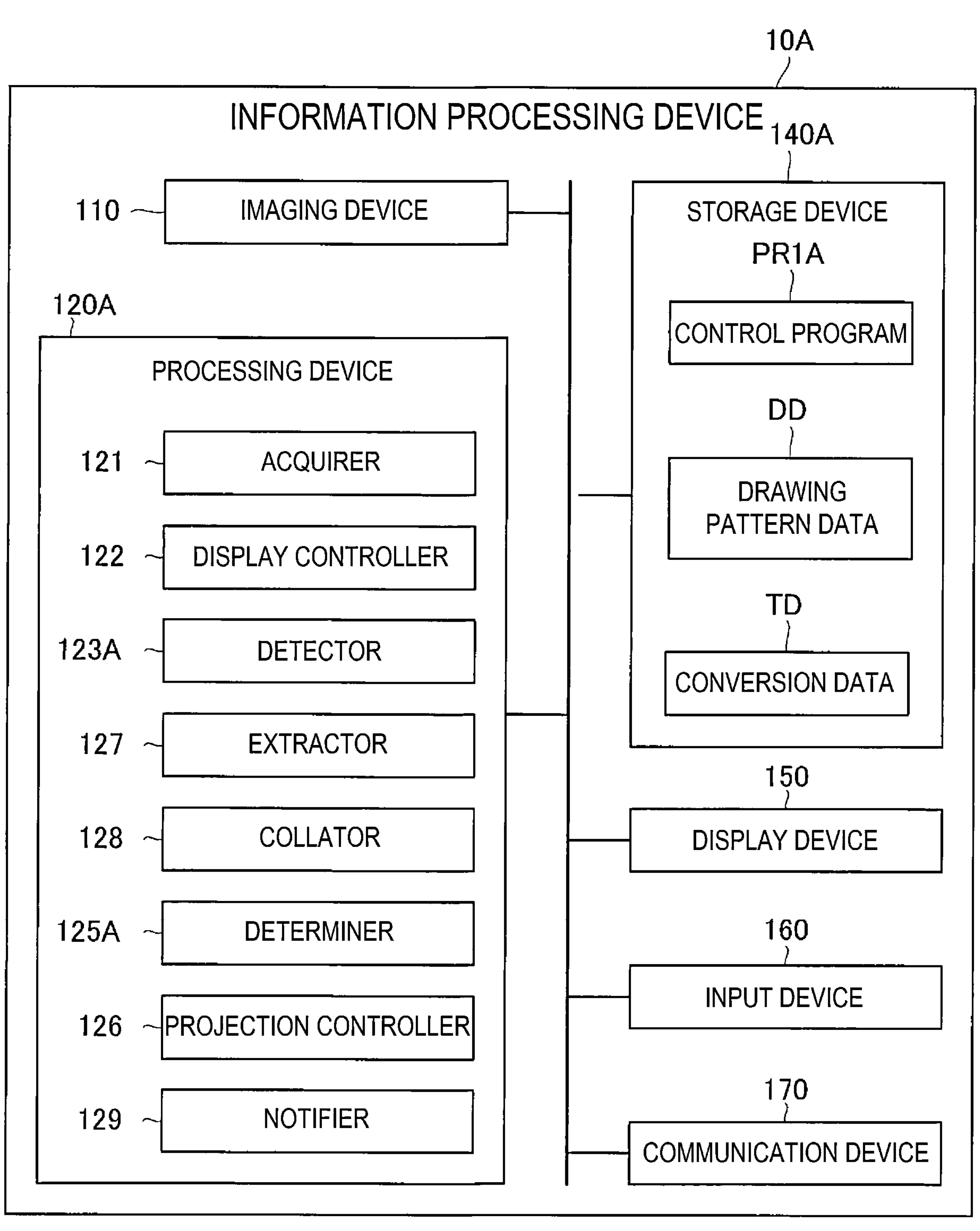
FIG. 17 is a block diagram illustrating a configuration example of an information processing device.

FIG. 17 is a block diagram illustrating a configuration example of the information processing device 10A. Unlike the information processing device 10, the information processing device 10A includes a processing device 120A instead of the processing device 120 and includes a storage device 140A instead of the storage device 140.

Unlike the storage device 140, the storage device 140A stores a control program PR1A instead of the control program PR1. In addition, the storage device 140A further stores conversion data TD indicating a conversion formula for a camera pixel coordinate and a projection pixel coordinate.

The processing device 120A reads the control program PR1A from the storage device 140A and executes the control program PR1A to thereby function as the acquirer 121, the display controller 122, a detector 123A, a determiner 125A, the projection controller 126, an extractor 127, a collator 128, and a notifier 129. The control program PR1A may be transmitted from, via a communication network, another device such as a server that manages the information processing device 10A.

The detector 123A detects the difference between an image of an object included in the captured image IG obtained by imaging the road surface RS and the projection image PI showing the drawing pattern on the road surface RS. The projection image PI showing the drawing pattern on the road surface RS includes an image showing a contour line of the first character L1 and an image showing an object on the road surface RS. The detector 123A regards that the image of the object included in the captured image IG obtained by imaging the road surface RS and the image showing the object on the road surface RS included in the projection image PI showing the drawing pattern on the road surface RS are the same. As a result, the detector 123A detects, as the difference, the image showing the contour line of the first character L1 included in the projection image PI showing the drawing pattern on the road surface RS.

The extractor 127 extracts, from the projection image PI showing the drawing pattern, the image showing the contour line of the first character L1 detected as the difference by the detector 123A and the image showing the object on the road surface RS.

The collator 128 performs pattern matching between the image of the object on the road surface RS included in the captured image IG and the image of the object on the road surface RS included in the projection image PI showing the drawing pattern to thereby calculate a correspondence relationship between both the images.

The determiner 125A determines, using the correspondence relationship calculated by the collator 128, magnification, an angle, and a position of the projection image PI such that the image of the object on the road surface RS included in the captured image IG and the image of the object on the road surface RS included in the projection image PI showing the drawing pattern overlap each other.

When the correspondence relationship calculated by the collator 128 does not satisfy a predetermined condition, the notifier 129 outputs a notification indicating that the position of the image showing the drawing pattern on the road surface RS cannot be determined. The predetermined condition is, for example, a condition that a coefficient of correlation between the image of the object on the road surface RS included in the captured image IG and the image of the object on the road surface RS included in the projection image PI showing the drawing pattern is lower than a threshold value when the collator 128 performs the pattern matching. The predetermined condition is an example of a "first condition".

Alternatively, the notifier 129 may output the notification when a projection range of the construction assisting device 1A does not include the object on the road surface RS. The notification is displayed on, for example, the display device 150.

When the notifier 129 outputs the notification, the construction assisting device 1A may execute the same projection method as the projection method of the construction assisting device 1 according to the first embodiment.

2-3: Projection Method for a Drawing Pattern

2-3-1: Projection Method for a First Character

Figures 19, 20:
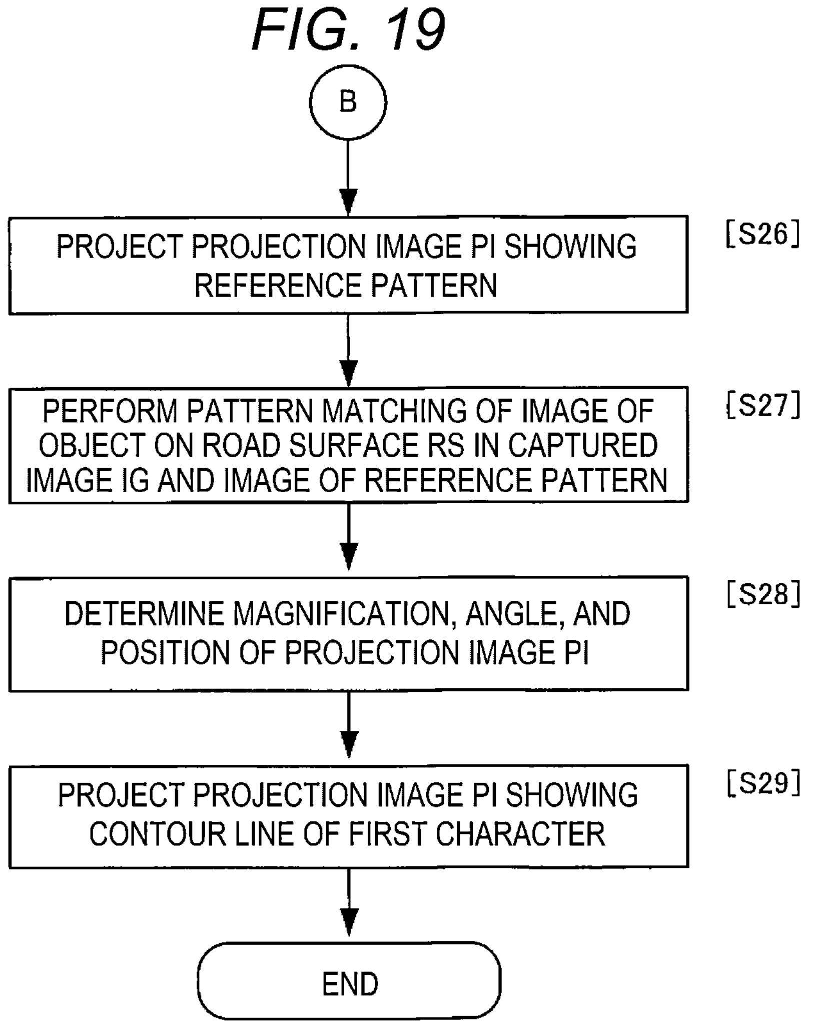
FIG. 19 is a flowchart illustrating the projection method for the projection image showing the drawing pattern by the construction assisting device.
FIG. 20 is a diagram illustrating an example of the projection image showing the drawing pattern.

FIGS. 18 and 19 are flowcharts illustrating a projection method for the projection image PI showing a drawing pattern by the construction assisting device 1A. More specifically, FIGS. 18 and 19 are flowcharts illustrating a projection method for the projection image PI corresponding to the image showing the first character L1 included in the drawing pattern. In FIGS. 18 and 19, steps including operation by the user U are indicated by dotted lines.

In step S21, the user U carries the construction assisting device 1 to an approximate position where the road marking RM is drawn on the road surface RS.

In step S22, the user U images the road surface RS with the imaging device 110 provided in the information processing device 10. The processing device 120A functions as the acquirer 121. The processing device 120A acquires the captured image IG captured by the imaging device 110.

In step S23, the processing device 120A functions as the projection controller 126 and the acquirer 121. The processing device 120A causes the projector 20 to project the projection image PI showing the drawing pattern onto an approximate position on the road surface RS. In step S23, the processing device 120A causes the imaging device 110 provided in the information processing device 10 to image the road surface RS onto which the projection image PI is projected. The processing device 120A acquires the captured image IG captured by the imaging device 110.

FIG. 20 is a diagram illustrating an example of the projection image PI showing the drawing pattern according to the present embodiment. The projection image PI includes an image showing the contour line of the first character L1 and includes an image CL1 showing the roadway center line CL and an image SL1 showing the stop line SL as an image representing an object on the road surface RS. The image representing the object on the road surface RS is an example of a "second image".

Figure 21:
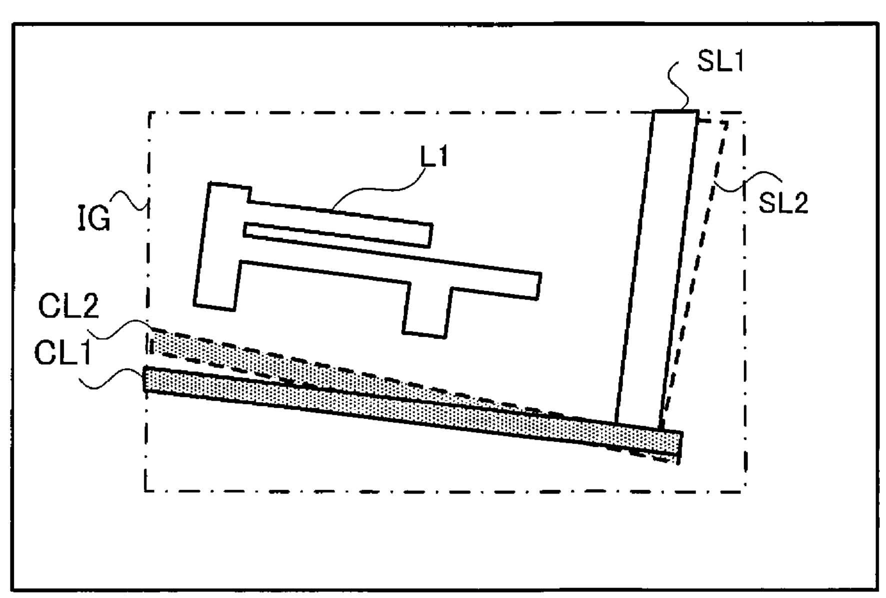
FIG. 21 is a diagram illustrating a captured image IG in the case in which the projection image is projected onto the road surface.

FIG. 21 is a diagram illustrating the captured image IG in the case in which the projection image PI illustrated in FIG. 20 is projected onto the road surface RS. The captured image IG includes an image showing a drawing pattern and a captured image of an object on the road surface RS. As described above, the image showing the drawing pattern includes the image showing the contour line of the first character L1, the image CL1 showing the roadway center line CL, and the image SL1 showing the stop line SL. The captured image IG of the object on the road surface RS includes a captured image CL2 of the roadway center line CL and a captured image SL2 of the stop line SL.

In step S24 of FIG. 18, the processing device 120A functions as the detector 123A. The processing device 120A detects a difference between the image of the object included in the captured image IG obtained by imaging the road surface RS and the projection image PI showing the drawing pattern on the road surface RS. In FIG. 21, the processing device 120A regards that the image CL1 showing the roadway center line CL and the captured image CL2 of the roadway center line CL are the same. The processing device 120A regards that the image SL1 showing the stop line SL and the captured image SL2 of the stop line SL are the same. As a result, the processing device 120A detects the contour line of the first character L1 as a difference.

Figure 22:
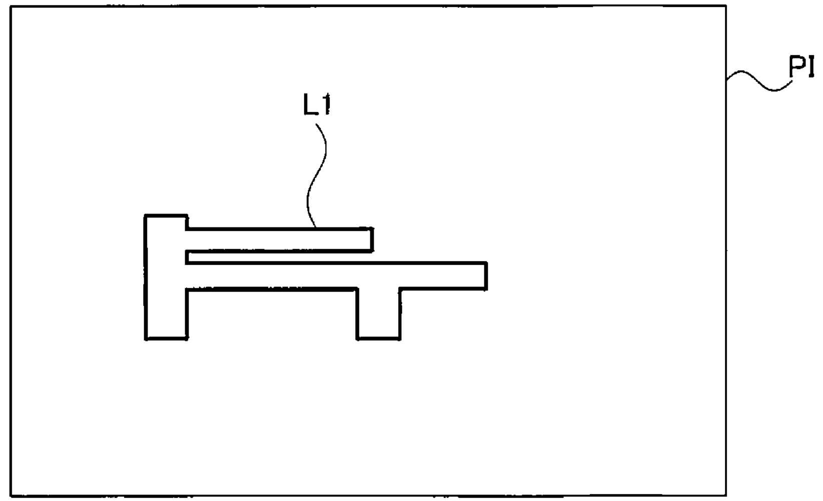
FIG. 22 is a diagram illustrating an example of the projection image showing a contour line of a first character L1.
Figure 23:
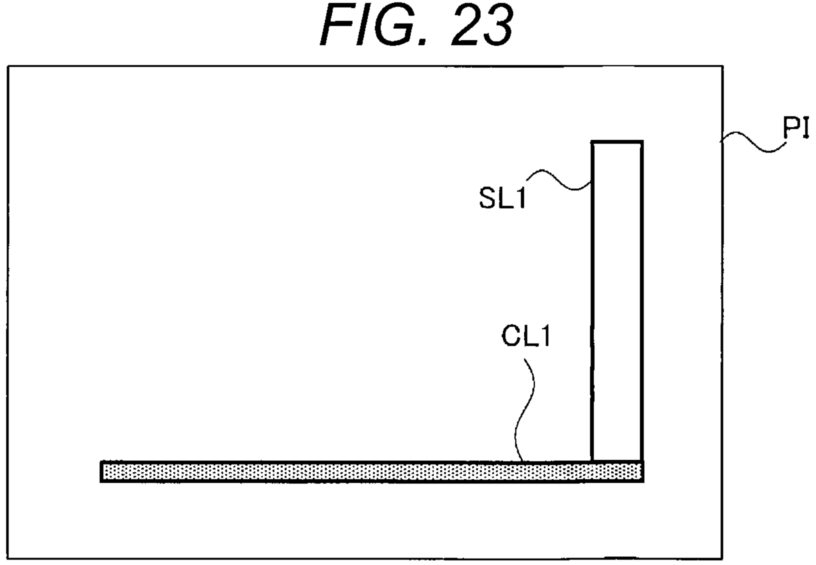
FIG. 23 is a diagram illustrating an example of the projection image showing a reference pattern.

In step S25, the processing device 120A functions as the extractor 127. The processing device 120A extracts, based on a detection result in step S24, the projection image PI showing the contour line of the first character L1 and the projection image PI showing the reference pattern from the projection image PI showing the drawing pattern. Here, the "projection image PI showing the reference pattern" is an image obtained by removing the projection image PI showing the contour line of the first character L1 from the projection image PI showing the drawing pattern. FIG. 22 is a diagram illustrating an example of the projection image PI showing the contour line of the first character L1. FIG. 23 is a diagram illustrating an example of the projection image PI showing the reference pattern. In the example illustrated in FIG. 23, the projection image PI showing the reference pattern includes the image CL1 showing the roadway center line CL and the image SL1 showing the stop line SL.

In step S26 of FIG. 19, the processing device 120A functions as the projection controller 126. The processing device 120A causes the projector 20 to project the projection image PI showing the reference pattern onto the road surface RS.

In step S27, the processing device 120A functions as the acquirer 121. The processing device 120A acquires the captured image IG captured by the imaging device 110. The processing device 120A functions as the collator 128. The processing device 120A performs pattern matching between the projection image PI showing the reference pattern and the image of the object on the road surface RS included in the captured image IG to calculate a correspondence relationship between both the images.

Figure 24:
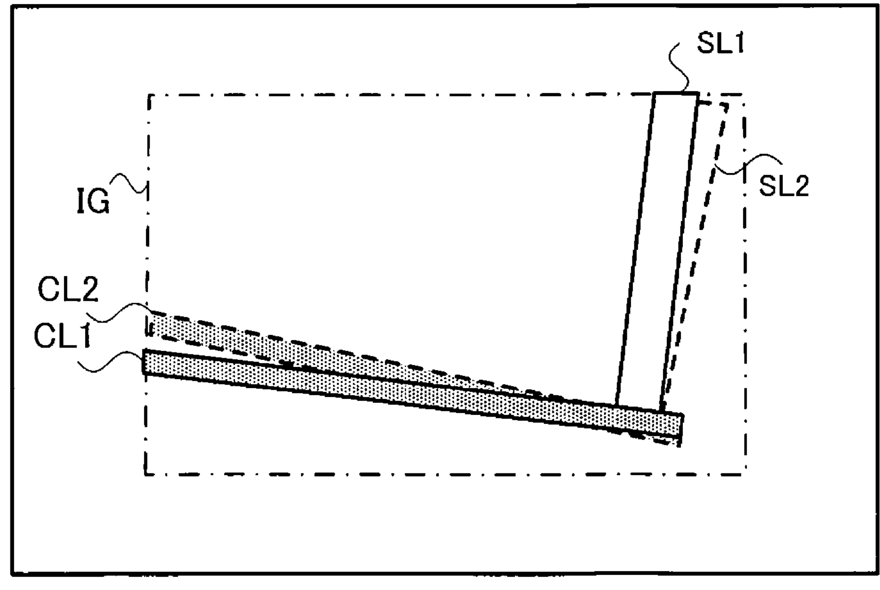
FIG. 24 is a diagram illustrating a captured image IG.

FIG. 24 is a diagram illustrating the captured image IG in step S27. The captured image IG includes the image CL1, the image SL1, the captured image CL2, and the captured image SL2. The image CL1 and the image SL1 are images of the object included in the captured projection image PI. The captured image CL2 and the captured image SL2 are images of the object on the road surface RS included in the captured image IG.

In step S28 of FIG. 19, the processing device 120A functions as the determiner 125A. The processing device 120A determines, using the correspondence relationship calculated in step S27, magnification, an angle, and a position of the projection image PI such that the image of the object on the road surface RS included in the captured image IG and the image of the object on the road surface RS included in the projection image PI showing the drawing pattern overlap each other.

In step S29, the processing device 120A functions as the projection controller 126. The processing device 120A causes the projector 20 to project the projection image PI showing the contour line of the first character L1 onto the road surface RS based on the magnification, the angle, and the position determined in step S28.

2-3-2: Projection Method for the Second and Subsequent Characters

As a projection method for the second character L2 and subsequent characters in the present embodiment, the same projection method as the projection method for the second character L2 and subsequent characters in the first embodiment may be used.

Alternatively, as the projection method of the second character L2 and subsequent characters in the present embodiment, the same projection method as the projection method for the first character L1 may be used using the contour line of the first character L1 as the same reference pattern as the reference pattern explained above in the present embodiment.

2-4: Effects Achieved by the Second Embodiment

With the construction assisting method according to the present embodiment, it is possible to further increase the speed of construction than the construction assisting method according to the first embodiment. It is possible to further reduce the time and effort of the operation by the user U than the construction assisting method according to the first embodiment.

3: MODIFICATIONS

The embodiments explained above can be variously modified. Specific aspects of modifications are exemplified below. The aspects exemplified below and the aspects explained in the embodiments explained above can be combined as appropriate within a range in which the aspects do not contradict each other. In the modifications illustrated below, for elements having action and functions equivalent to those in the embodiments, the reference numerals and signs used in the above explanation are used and detailed explanation of the elements is omitted as appropriate.

3-1: Modification 1

In the first embodiment, the projection controller 126 may cause the projector 20 to project the auxiliary image AI onto the road surface RS together with the projection image PI.

3-2: Modification 2

In step S2 in the first embodiment, the processing device 120 serves as the projection controller 126 and causes the projector 20 to project the fixed form image onto the road surface RS. However, the processing device 120 may calculate the correspondence relationship between the size of one pixel on the panel provided in the projection device 210 and the distance on the road surface RS by causing the projection device 210 to project, instead of the fixed form image, the projection image PI showing the drawing pattern.

4: SUMMARY OF THE PRESENT DISCLOSURE

A summary of the present disclosure is appended below.

(Appendix 1) A construction assisting method including: acquiring a captured image showing a road surface and an object on the road surface; determining, based on the object on the road surface included in the captured image, a position on the road surface onto which a first image used for painting a road marking on the road surface is projected; and causing an optical device to project the first image onto the position on the road surface.

Accordingly, there is provided a construction method for a road marking with less restriction on a place where the construction method can be used compared with the related art.

In a general construction method for a road marking, a worker often manually draws, using a marker, a draft for painting a road marking on a road surface. Since a ratio of a time required for drawing such a draft to an entire construction time is large, work efficiency has been demanded. With the construction assisting method according to the present disclosure, positioning work performed by the worker when manually drawing the draft using the marker is simplified or, since work itself for manually drawing the draft using the marker is unnecessary, work efficiency is possible compared with when all the work for drawing the draft is manually performed. For drawing of a draft line using the marker, a workman's skill is required. However, with the construction assisting method according to the present disclosure, even a beginner can accurately draw the draft line.

(Appendix 2) The construction assisting method described in the appendix 1, further including: receiving operation of selecting, from the captured image, two parallel first line segments indicating at least a part of a contour of the object on the road surface; and receiving input indicating a first distance between the two first line segments on the road surface, in which the position on the road surface is determined based on the two first line segments and the first distance.

Accordingly, it is possible to determine, using dimensions concerning the object on the road surface, the position on the road surface onto which the first image is projected. As a result, further work efficiency is possible.

(Appendix 3) The construction assisting method described in the appendix 1 or 2, further including causing a display device to display an auxiliary image used for determining the position on the road surface.

Accordingly, when the construction assisting method according to the present disclosure is executed, the user U of the construction assisting method can easily understand operation content. As a result, further work efficiency is possible.

(Appendix 4) The construction assisting method described in the appendix 3, in which the auxiliary image indicates at least one of the first image, the two first line segments, the first distance, and a distance between the first image on the road surface and the object on the road surface.

Accordingly, when the construction assisting method according to the present disclosure is executed, the user U of the construction assisting method can easily understand operation content. As a result, further work efficiency is possible.

(Appendix 5) The construction assisting method described in the appendix 2, in which the first image includes a plurality of line segments indicating at least a part of a contour of the road marking, the construction assisting method further includes: receiving operation of selecting two parallel second line segments among the plurality of line segments from the first image; and receiving input indicating a second distance between the two second line segments on the road surface, and the position on the road surface onto which the first image is projected is determined based on the two first line segments, the first distance, the two second line segments, and the second distance.

Accordingly, it is possible to more accurately determine, based on the two second line segments and the second distance in addition to the two first line segments and the first distance, a position on the road surface RS onto which the first image is projected.

(Appendix 6) The construction assisting method described in any one of the appendices 1 to 5, in which the object on the road surface includes at least one of a road marking painted on the road surface in advance, a structure fixed to the road surface, and an object, at least a part of which is a straight line, placed on the road surface.

Accordingly, it is possible to determine, using an object present on the road surface RS in advance, the position on the road surface RS onto which the first image is projected.

(Appendix 7) The construction assisting method described in the appendix 1, in which the object on the road surface includes at least one of a road marking painted on the road surface in advance and a structure fixed to the road surface, the first image includes a second image representing the object on the road surface, the construction assisting method further includes causing the optical device to project the first image onto the road surface before determining the position on the road surface onto which the first image is projected, and the position on the road surface onto which the first image is projected is determined based on a correspondence relationship between an image of the object on the road surface included in the captured image and the second image on the road surface.

Accordingly, by determining the position on the road surface RS based on the correspondence relationship between the image of the object on the road surface included in the captured image and the second image, it is possible to more easily determine the position on the road surface RS onto which the first image is projected.

(Appendix 8) The construction assisting method described in the appendix 7, further including, when the correspondence relationship does not satisfy a first condition, outputting a notification indicating that the position on the road surface cannot be determined.

Accordingly, when the position on the road surface RS cannot be determined because the correspondence relationship does not satisfy the first condition, the user U of the construction assisting method can consider another construction assisting method.

(Appendix 9) A construction assisting device including a processing device configured to execute: acquiring a captured image showing a road surface and an object on the road surface; determining, based on the object on the road surface included in the captured image, a position on the road surface onto which a first image used for painting a road marking on the road surface is projected; and causing an optical device to project the first image onto the position on the road surface.

Accordingly, there is provided a construction assisting device for a road marking with less restriction on a place where the construction assisting device can be used compared with the related art.

In a general construction method for a road marking, a worker often manually draws, using a marker, a draft for painting a road marking on a road surface. Since a ratio of a time required for drawing such a draft to an entire construction time is large, work efficiency has been demanded. With the construction assisting device according to the present disclosure, positioning work performed by the worker when manually drawing the draft using the marker is simplified or, since work itself for manually drawing the draft using the marker is unnecessary, work efficiency is possible compared with when all the work for drawing the draft is manually performed. For drawing of a draft line using the marker, a workman's skill is required. However, with the construction assisting device according to the present disclosure, even a beginner can accurately draw the draft line.

(Appendix 10) A non-transitory computer-readable storage medium storing an information processing program, the information processing program causing a computer to implement: acquiring a captured image showing a road surface and an object on the road surface; determining, based on the object on the road surface included in the captured image, a position on the road surface onto which a first image used for painting a road marking on the road surface is projected; and causing an optical device to project the first image onto the position on the road surface.

Accordingly, there is provided a non-transitory computer-readable storage medium storing an information processing program with less restriction on a place where non-transitory computer-readable storage medium storing the information processing program can be used compared with the related art.

In a general construction method for a road marking, a worker often manually draws, using a marker, a draft for painting a road marking on a road surface. Since a ratio of a time required for drawing such a draft to an entire construction time is large, work efficiency has been demanded. With the non-transitory computer-readable storage medium storing the information processing program according to the present disclosure, positioning work performed by the worker when manually drawing the draft using the marker is simplified or, since work itself for manually drawing the draft using the marker is unnecessary, work efficiency is possible compared with when all the work for drawing the draft is manually performed. For drawing of a draft line using the marker, a workman's skill is required. However, with the non-transitory computer-readable storage medium storing the information processing program according to the present disclosure, even a beginner can accurately draw the draft line.

What is claimed is:

1. A construction assisting method comprising:
- acquiring a captured image showing a road surface and an object on the road surface, the captured image including a plurality of line segments each indicating at least a part of a contour of the object on the road surface;
- receiving a selection, by a user, of two parallel first line segments from a plurality of line segments as reference lines;
- receiving input of a first distance between the two parallel first line segments on the road surface;
- determining, based on the two parallel first line segments and the first distance, a position on the road surface onto which a first image used for painting a road marking on the road surface is projected; and
- causing an optical device to project the first image onto the position on the road surface.

2. The construction assisting method according to claim 1, further comprising:
- receiving operation of selecting, from the captured image, the two parallel first line segments; and
- receiving input indicating a first distance between the two first line segments on the road surface, wherein
- the position on the road surface is determined based on the two first line segments and the first distance.

3. The construction assisting method according to claim 1, further comprising causing a display device to display an auxiliary image used for determining the position on the road surface.

4. The construction assisting method according to claim 1, further comprising causing a display device to display an auxiliary image used for determining the position on the road surface, wherein
- the auxiliary image indicates at least one of the first image, the two first line segments, the first distance, and a distance between the first image on the road surface and the object on the road surface.

5. The construction assisting method according to claim 2, wherein
- the first image includes a plurality of line segments indicating at least a part of a contour of the road marking,
- the construction assisting method further comprises:
  - receiving operation of selecting two parallel second line segments among the plurality of line segments from the first image; and
  - receiving input indicating a second distance between the two second line segments on the road surface, and
- the position on the road surface onto which the first image is projected is determined based on the two first line segments, the first distance, the two second line segments, and the second distance.

6. The construction assisting method according to claim 1, wherein the object on the road surface includes at least one of a road marking painted on the road surface in advance, a structure fixed to the road surface, and an object, at least a part of which is a straight line, placed on the road surface.

7. The construction assisting method according to claim 1, wherein
- the object on the road surface includes at least one of a road marking painted on the road surface in advance and a structure fixed to the road surface,
- the first image includes a second image representing the object on the road surface,
- the construction assisting method further comprises causing the optical device to project the first image onto the road surface before determining the position on the road surface onto which the first image is projected, and
- the position on the road surface onto which the first image is projected is determined based on a correspondence relationship between an image of the object on the road surface included in the captured image and the second image on the road surface.

8. The construction assisting method according to claim 7, further comprising, when the correspondence relationship does not satisfy a first condition, outputting a notification indicating that the position on the road surface cannot be determined.

9. A construction assisting device comprising a processing device programmed to execute:
- acquiring a captured image showing a road surface and an object on the road surface, the captured image including a plurality of line segments each indicating at least a part of a contour of the object on the road surface;

receiving a selection, by a user, of two parallel first line segments from the plurality of line segments as reference lines;

receiving input of a first distance between the two parallel first line segments on the road surface;

determining, based on the two parallel first line segments and the first distance, a position on the road surface onto which a first image used for painting a road marking on the road surface is projected;

causing an optical device to project the first image onto the position on the road surface.

10. A non-transitory computer-readable storage medium storing an information processing program, the information processing program causing a computer to implement:

acquiring a captured image showing a road surface and an object on the road surface, the captured image including a plurality of line segments each indicating at least a part of a contour of the object on the road surface;

receiving a selection, by a user, of two parallel first line segments from the plurality of line segments as reference lines;

receiving input of a first distance between the two parallel first line segments on the road surface;

determining, based on the two parallel first line segments and the first distance, a position on the road surface onto which a first image used for painting a road marking on the road surface is projected;

causing an optical device to project the first image onto the position on the road surface.

* * * * *